(12) United States Patent
Nerius et al.

(10) Patent No.: US 11,250,202 B2
(45) Date of Patent: Feb. 15, 2022

(54) SYSTEM AND METHOD FOR LARGE VOLUME DATA STREAMING AS A SERVICE

(71) Applicant: ServiceNow, Inc., Santa Clara, CA (US)

(72) Inventors: Joshua Timothy Nerius, Chicago, IL (US); Venkata Kiran Kumar Koya, Poway, CA (US); Deepti Suryakant Bhogle, San Diego, CA (US); Pierce Edward Courtney, San Diego, CA (US); Nicholas Michael Stark, San Diego, CA (US); Harry Thomas Nelson, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/543,041

(22) Filed: Aug. 16, 2019

(65) Prior Publication Data
US 2020/0302001 A1  Sep. 24, 2020

Related U.S. Application Data

(60) Provisional application No. 62/820,698, filed on Mar. 19, 2019.

(51) Int. Cl.
| | |
|---|---|
| *G06F 40/10* | (2020.01) |
| *G06F 40/114* | (2020.01) |
| *G06F 40/186* | (2020.01) |
| *G06F 40/205* | (2020.01) |
| *G06F 3/0486* | (2013.01) |

(52) U.S. Cl.
CPC .......... *G06F 40/114* (2020.01); *G06F 40/186* (2020.01); *G06F 40/205* (2020.01); *G06F 3/0486* (2013.01)

(58) Field of Classification Search
CPC .... G06F 40/114; G06F 40/186; G06F 40/205; G06F 3/0486
See application file for complete search history.

(56) References Cited

U.S. PATENT DOCUMENTS

| | | |
|---|---|---|
| 6,678,887 B1 | 1/2004 | Hallman |
| 7,020,706 B2 | 3/2006 | Cates |
| 7,350,209 B2 | 3/2008 | Shum |
| 7,716,353 B2 | 5/2010 | Golovinsky |
| 7,769,718 B2 | 8/2010 | Murley |

(Continued)

*Primary Examiner* — Hope C Sheffield
(74) *Attorney, Agent, or Firm* — Fletcher Yoder PC

(57) ABSTRACT

A computing system includes a server. The server is communicatively coupled to a data repository and is configured to store a data in the data repository. The server is further configured to configure, via the data stream handler system, the data stream object to transmit a request to an external system. The server is additionally configured to configure, via the data stream handler system, the data stream object to capture a response from the external system, wherein the response comprises a paginated data set, a data stream, or a combination thereof, wherein creating the data stream object, configuring the data stream object to transmit the request, configuring the data stream object to capture the response, or a combination thereof, comprises using visual controls in lieu of entering text for a computer program.

19 Claims, 23 Drawing Sheets

(56) References Cited

U.S. PATENT DOCUMENTS

| | | | |
|---|---|---|---|
| 7,890,802 B2 | 2/2011 | Gerber | |
| 7,925,981 B2 | 4/2011 | Pourheidari | |
| 8,374,986 B2 * | 2/2013 | Indeck | G06N 5/025 |
| | | | 706/47 |
| 8,402,127 B2 | 3/2013 | Solin | |
| 8,612,408 B2 | 12/2013 | Trinon | |
| 8,832,652 B2 | 9/2014 | Mueller | |
| 8,983,982 B2 | 3/2015 | Rangarajan | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,508,051 B2 | 11/2016 | Falk | |
| 9,535,674 B2 | 1/2017 | Cooper | |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,766,935 B2 | 9/2017 | Kelkar | |
| 9,805,322 B2 | 10/2017 | Kelkar | |
| 2008/0201118 A1 * | 8/2008 | Luo | G06F 16/958 |
| | | | 703/2 |
| 2009/0288012 A1 * | 11/2009 | Hertel | G06Q 20/326 |
| | | | 715/738 |
| 2011/0302551 A1 * | 12/2011 | Hummel, Jr. | G06F 3/04842 |
| | | | 717/105 |
| 2015/0170382 A1 * | 6/2015 | Bhatia | G06F 16/252 |
| | | | 345/440 |
| 2016/0092176 A1 * | 3/2016 | Straub | G06F 3/0486 |
| | | | 717/107 |
| 2019/0102390 A1 * | 4/2019 | Antunes | G06F 40/295 |

* cited by examiner

SYSTEM AND METHOD FOR LARGE VOLUME DATA STREAMING AS A SERVICE

CROSS REFERENCE TO RELATED APPLICATION

This application claims priority to and benefit of U.S. Provisional Patent Application No. 62/820,698, entitled "SYSTEM AND METHOD FOR LARGE VOLUME DATA STREAMING AS A SERVICE", filed Mar. 19, 2019, which is herein incorporated by reference in its entirety for all purposes.

BACKGROUND

The present disclosure relates generally to large volume data streaming, and more specifically to large volume data streaming as a service.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Within the context of cloud computing solutions for data repositories, users may be asked to deal with ever increasing amounts of data, e.g., including certain date-based information stored in the data repositories. In fact, the amount of cloud-based and date-based data collected and stored in today's cloud computing solutions, such as cloud-based repositories, may be orders of magnitude greater than what was historically collected and stored. Users tasked with automating and/or troubleshooting enterprise, IT, and/or other organization-related functions (e.g., incident tracking and/or help desk-related functions) navigate ever increasing amounts of date-based data to properly and efficiently perform their job functions.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Information Technology (IT) networks may include a number of computing devices, server systems, databases, and the like that generate, collect, and store information. As increasing amounts of data representing vast resources become available, it becomes increasingly difficult to analyze the data, interact with the data, and/or provide reports for the data. The current embodiments enable systems and methods that may be used to create objects (e.g., data stream objects) that access very large datasets for use when interacting with third party systems. The data stream objects may be included in certain systems that provide for visual, natural language-based development of automated processes. For example, a Flow Designer system may include a flowchart-like development approach in lieu of typing in computer code. In certain embodiments, the Flow Designer system may include visual tools to create the data stream objects to handle a variety of very large data set interactions, including pagination interactions, thus improving the resultant automated processes developed via the Flow Designer system.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
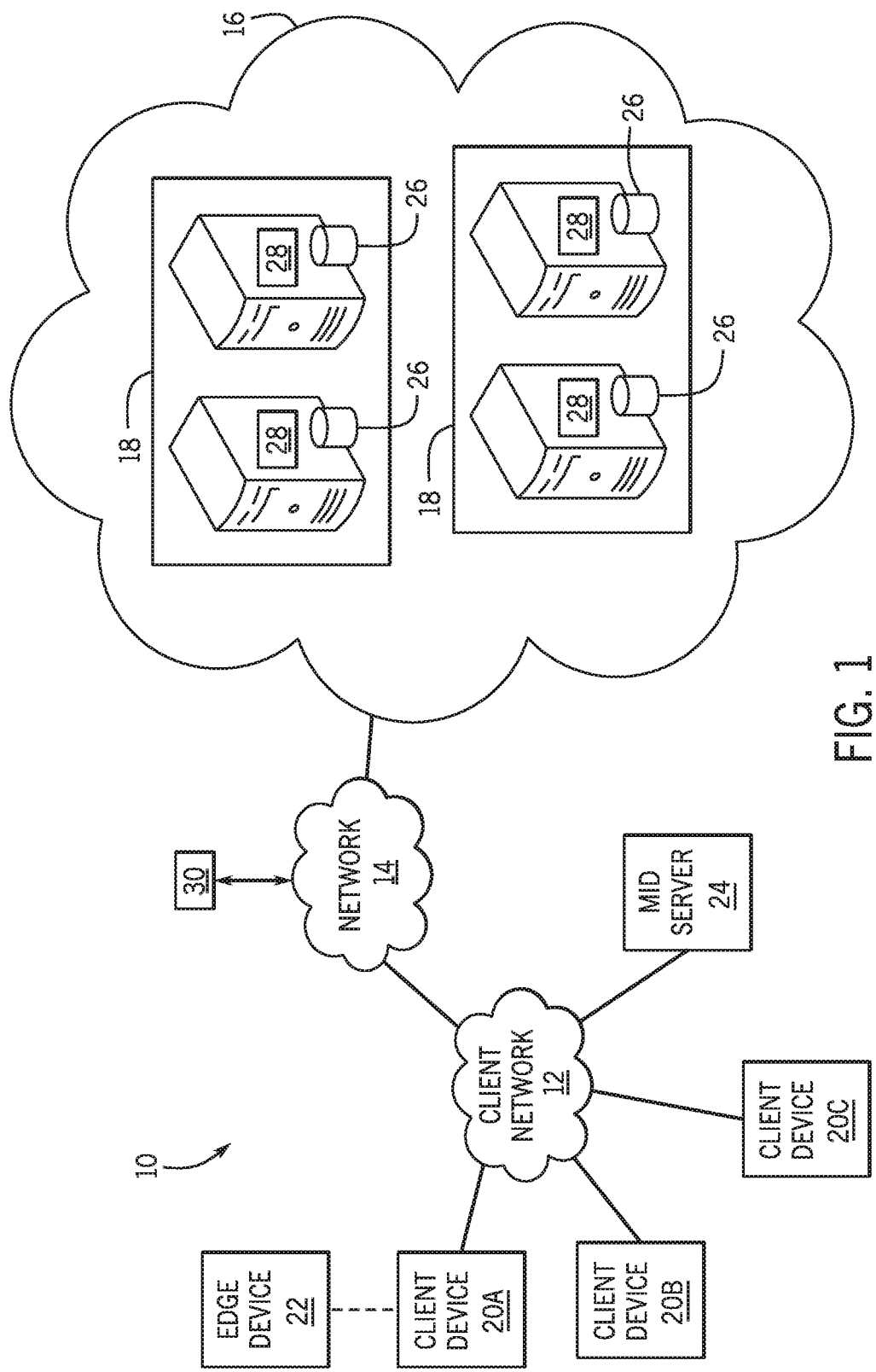
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device that includes, but is not limited to a computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, the term "very large dataset" may refer to data in excess of 100 megabytes (Mb). The term "flow" may refer to data processing of information (e.g., database records) that may be presented to a user in a flow chart-like view. A flow may have inputs but may not have an output. A flow may include one or more "sub-flows" and/or one or more "Actions." The flow may also include "triggers" and control logic. A "sub-flow" as used herein may refer to data processing of information (e.g., database records) also presented to the user in a flow chart-like view. Unlike the flow, a sub-flow may have both inputs and outputs. A sub-flow may additionally contain Actions, triggers, control logic and/or other sub-flows. A "trigger" may be "fired" or turned on by a change in certain conditions, such as a change in one or more database records. The trigger may also be "fired" or otherwise turned on via a schedule, e.g., daily, weekly, monthly schedule. "Action" as used herein may include one or more "Steps." Steps may be self-contained code, such as scripts (e.g., Java, JavaScript code) provided by the manufacturer of the software tools used to create the flows, sub-flows, and the like. A "DataStream Action" may refer to an Action object that may be used to process very large datasets. Steps may also be provided by users and any other entity. As used herein, the terms "flow objects" may refer to flows, sub-flows, Actions, and Steps.

Present embodiments are directed to providing for the creation, management, and/or subsequent use of objects, including data streaming objects, that handle application programming interface (API) responses that include data too large to load into memory (e.g., very large datasets). The data streaming objects may enable a user (e.g., developer) to specify pagination logic via a template-based system, suitable for using a variety of pagination options, including next page token pagination, next link pagination, offset pagination, and/or custom pagination, as further described below. The template-based data stream system (e.g., data stream wizard-like system) may guide a user through a series of pages based on the API to be used, e.g., representational state transfer (REST) APIs, simple object access protocol (SOAP) APIs, hypertext transfer protocol (HTTP)-based APIs, and so on. By providing for techniques to handle API responses that include very large datasets, including visual techniques, the systems and methods described herein may enable more flexible development of a variety of automated processes.

With the preceding in mind, the following figures relate to various types of generalized system architectures or configurations that may be employed to provide services to an organization accessing a cloud-platform, such as may be embodied in a multi-instance or multi-tenant framework on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 in which embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) that includes a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to the network 14, which may include one or more computing networks, such as other LANs, wide area networks (WAN), the Internet, and/or other remote networks, in order to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), WiFi® networks (WIFI is a registered trademark owned by Wi-Fi Alliance Corporation), and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary Java® Virtual Machine), and/or a database server, e.g., a unitary MySQL® catalog (MySQL® is a registered trademark owned by MySQL AB A COMPANY).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules.

It would be beneficial to more easily handle API responses that include very large datasets. Accordingly, a Data Stream Handler system 28 may be provided, to be used to create certain Data Stream objects suitable for handling very large datasets. For example, external systems 30, such as third party systems, may include application programming interfaces (APIs) suitable for providing access to and processing via the external systems 30. For example, the external systems 30 may include representational state transfer (REST) APIs, simple object access protocol (SOAP) APIs, hypertext transfer protocol (HTTP)-based APIs, and the like, that respond with very large datasets. The Data Stream Handler system 28 may provide, for example, for visual tools that enable a more flexible and efficient creation of certain Data Stream objects that can handle very large data set responses when interfacing with the external systems 30, as further described below.

Figure 2:
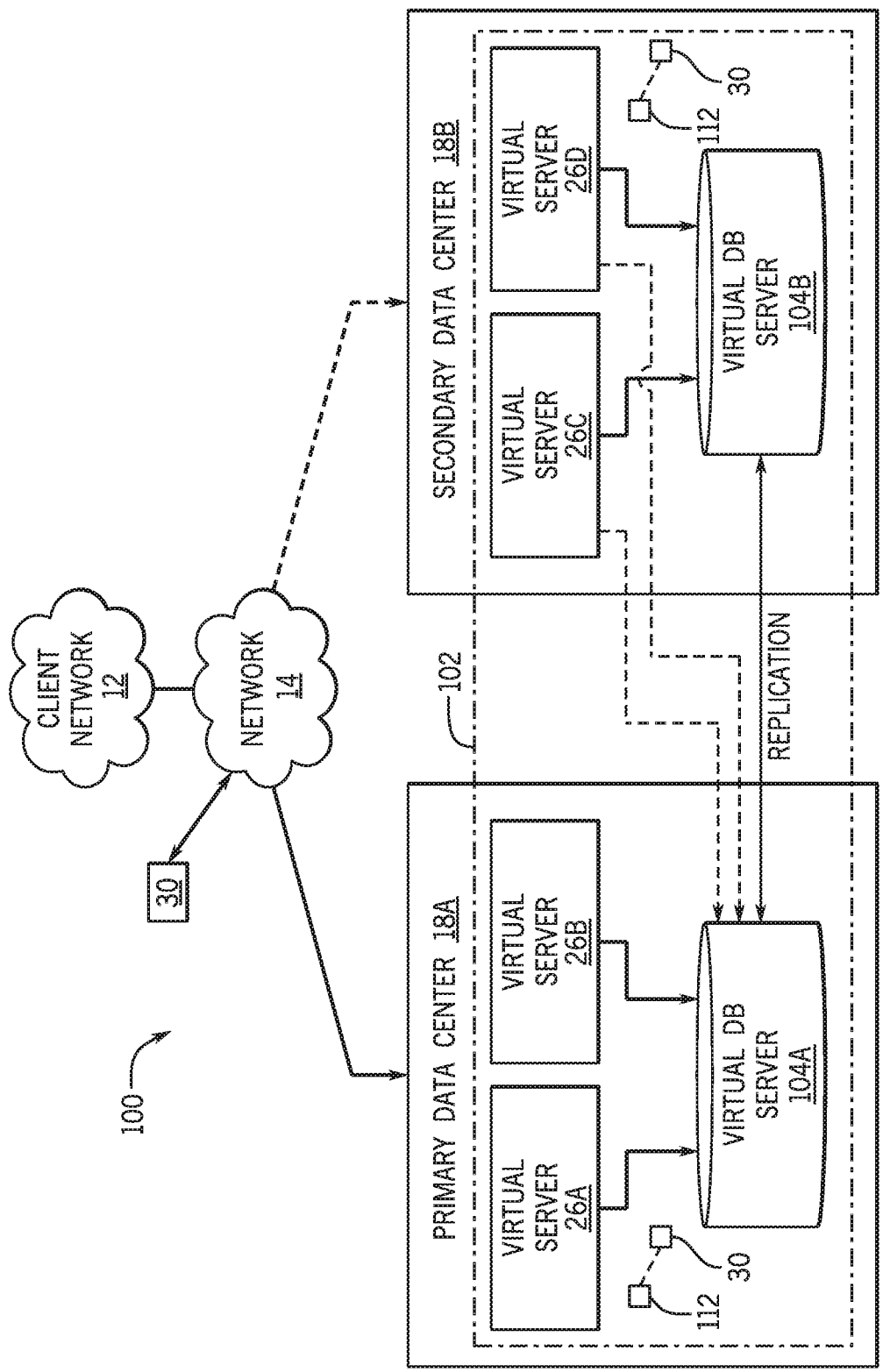
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

In the depicted embodiment, the Data Stream Handler system 28 may provide for visual tools to create and implement handling of very large dataset responses, including pagination responses sent via the external systems 30. That is, the Data Stream Handler system 28 may enable flows created, for example by a Flow Designer system 112, to operatively couple with the external systems 30 and to process API responses that may include pagination responses. The flows may then provide for handling of a variety of API responses having very large datasets that may occur during interfacing with the external systems 30. In the depicted example, the virtual servers 26 and/or the virtual database servers 104 include or may be operatively coupled to the Data Stream Handler system 28 and to the Flow Designer system 112. Automation processes (e.g., flows) created by the Flow Designer system 112 as further described below may thus include Data Stream objects (e.g., Data Stream Actions, Data Stream Steps) created by the Data Stream Handler system 28. Additionally, the Data Stream Handler system 28 may be included in the Flow Designer system 112 and/or may be operatively coupled to the Flow Designer system 112. Further, software development activities, e.g., objects created via the Flow Designer system 112 may be created without resorting to typing in computer code.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server. Using FIG. 2 as an example, the virtual servers 26A, 26B, 26C, 26D and virtual database servers 104A, 104B may be combined into a single virtual server. The use and discussion of FIGS. 1 and 2 are only examples to facilitate ease of description and explanation of discrete or functional concepts and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
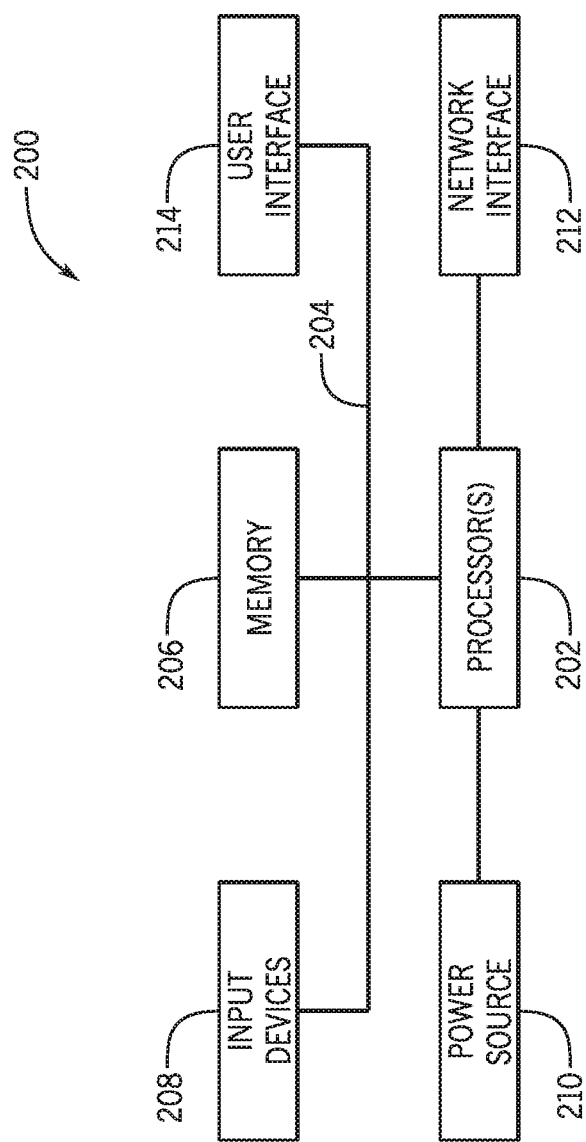
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 includes suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processor 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
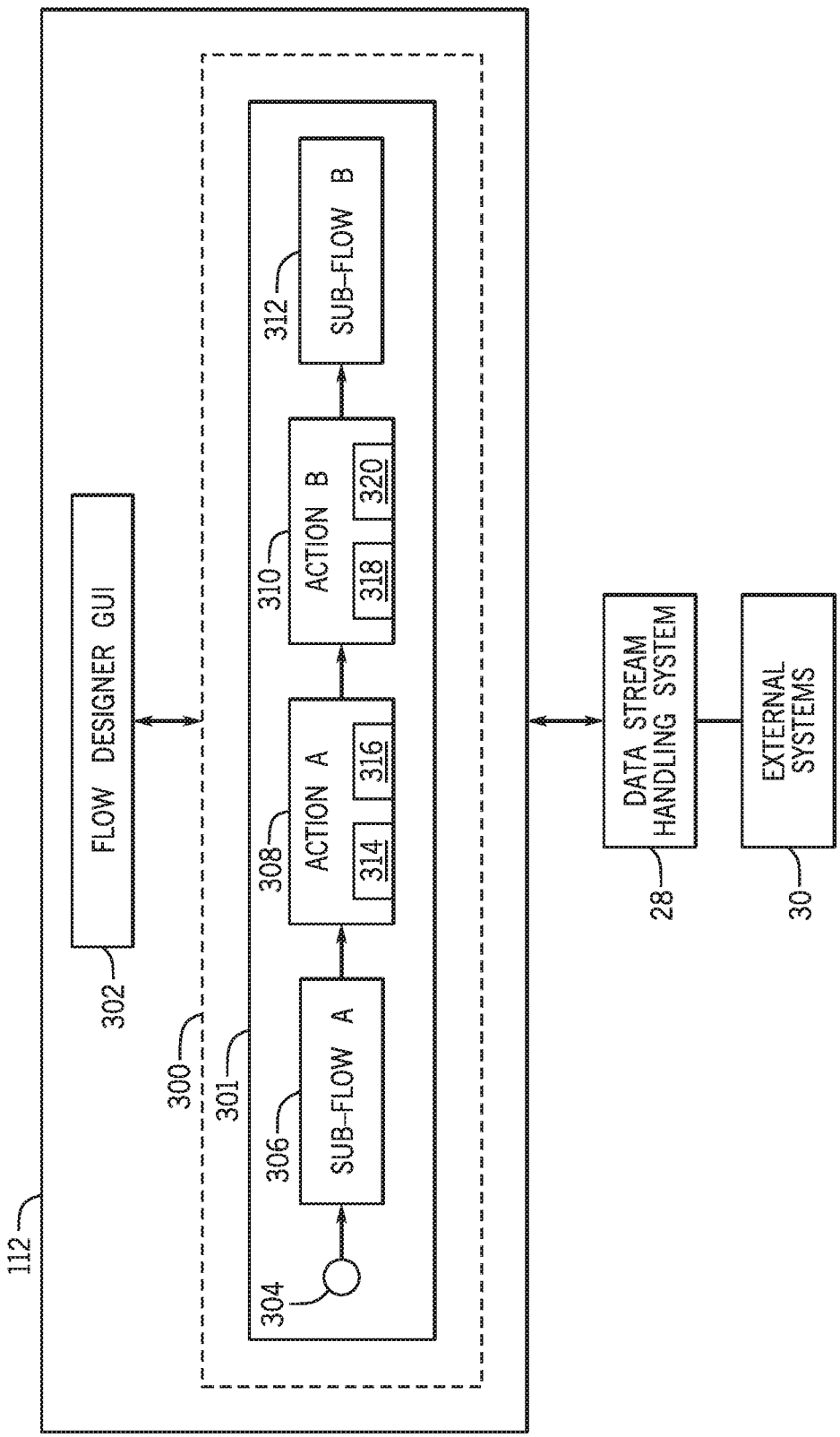
FIG. 4 is a block diagram illustrating a flow data processing system suitable for creating custom flow objects that may include electronic signature requests and subsequent electronic signature capture, in accordance with an embodiment.

It may be beneficial to describe certain computing resources that may be used in accordance with the techniques described herein. Turning now to FIG. 4, the figure is a block diagram illustrating an embodiment of the Flow Designer system 112 suitable for creating information flow objects 300 that may be used to design a flow for implementation of a cloud platform. In the depicted example, the Data Stream handler system 28 may provide for the creation of certain Data Stream objects suitable for use via the Flow Designer system 112, as further described below. The Data Stream handler system 28 may be included in the Flow Designer system 112 and/or operatively coupled with the Flow Designer system 112.

It is to be understood that the Flow Designer system 112 as depicted is an example only and may be included in or implemented using one or more of the virtual servers 26, the virtual DB servers 104, or a combination thereof. In the depicted embodiment, the Flow Designer system 112 includes a flow designer GUI 302, e.g., a visual information flow creation tool. The flow designer GUI 302 may provide for visual programming via natural languages as opposed to entering text representative of a computer program. The flow designer GUI 302 may include executable code or computer instructions suitable for creating, managing, accessing, and/or editing the flow objects 300. In the depicted embodiment, a single flow 301 is shown in the flow objects 300. It is to be understood that more than one flow may be provided in the flow objects 300.

The flow 301 may include a trigger 304 which may be "fired" or otherwise turned on by certain changed condition, such as a change in one or more records stored in a database (e.g., stored in the virtual DB servers 104). The trigger 304 may additionally be "fired" periodically, for example, as part of a schedule (e.g., hourly schedule, daily schedule, weekly schedule, monthly schedule, and so on). The trigger 304 may thus be used to initiate execution of other flow objects 300, such as sub-flow 306, Action 308, Action 310, and sub-flow 312.

In the depicted embodiment, the trigger 304 initiates execution of the sub-flow 306. The sub-flow 306 may include Actions, control logic (e.g., Boolean logic, branching logic, termination logic), other sub-flows, and so on. The sub-flow 306 may additionally take in inputs and provide outputs. For example, output of the sub-flow 306 may be used as input to the Action 308. The Action 308 may use the inputs provided to execute Steps 314, 316. The Action 308 may also include control logic. Steps, such as the Steps 314, 316, and may be self-contained code, such as scripts (e.g., Java, JavaScript code) provided by the manufacturer of the flow designer system 112. As an example, the Flow Designer system 112 may be provided by ServiceNow™ Inc., of Santa Clara, Calif., U.S.A., under the name Flow Designer™. The Steps 314, 316 may be additionally or alternatively provided by other third parties and/or coded by certain users, such as IT users.

Steps may include any number of functionalities, such as requesting approval from other users of the servers 26, 104, creating records in a database table, editing the record in the database table, deleting the records in the database table, creating server tasks, logging messages, looking up database information, notifying of certain events (e.g., incidents, change requests, problems, changes to user records), executing scripts, such as JavaScript, sending email, waiting for a condition to occur, and so on. Action 310 may execute following Action 308. In turn, Action 310 may include Steps 318, 320, and upon completion of Step 320, sub-flow 312 may be executed. Once sub-flow 312 finishes execution, the flow 301 finishes. Flows, such as the flow 301, may not have outputs. The flows may be executable from external clients, such as a clients coupled to the client network 12 shown in FIG. 1.

The Actions 308, 310 may be Data Stream Actions created via the Data Stream Handler system 28. That is, the Actions 308 and/or 310 may include certain techniques, including pagination handling techniques that may enable a more efficient handling of large data sets incoming from the external systems 30. The techniques described herein may provide for a visual tools-based creation of Data Stream Actions 308, 310, which may include using a template-based approach to more efficiently enter certain information. The Data Stream Actions 308, 310 thus created may then be used to interface with external systems 30 that may return very large datasets.

A call originating from a Flow Designer system's object may use the external system's APIs to retrieve certain data that may include hundreds or thousands of pages of data, and for each page, an API call may be executed to retrieve data contained in that page. A Subflow (or Action) object may handle the execution of the API calls to external systems 30 as part of a discovery job, and with each response, external systems 30 may return a token indicating that more data is available. The techniques described herein provide for more efficient development of automated processes that handle a variety of pagination techniques suitable for use in various external systems 30.

Figure 5:
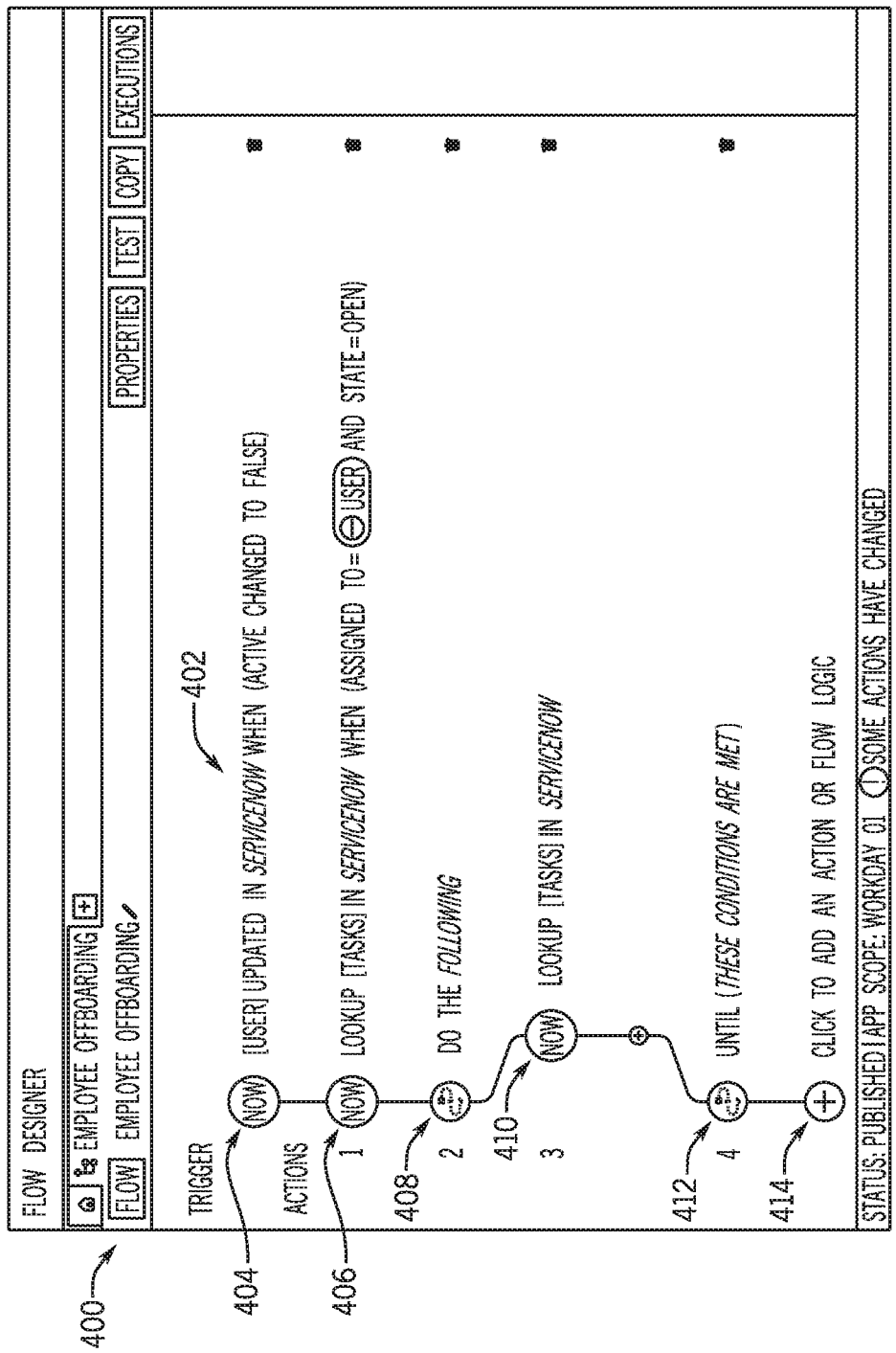
FIG. 5 is a screenshot of an embodiment of a graphical user interface (GUI) suitable for creating and/or editing flow objects, in accordance with an embodiment.

FIG. 5 is a screenshot depicting an embodiment of a graphical user interface (GUI) 400 suitable for inputting certain flow objects 300 into a flow, such as the flow 301. The GUI 400 may be accessible once the user 303 is authenticated via the authentication system 110 and used to create the flow 301 via the Flow Designer system 112. In the depicted embodiment, a graphical flow view 402 of a flow is shown. Indeed, the GUI 400 may be used to create and edit any number of graphical flow views that may then be executed as flow objects 300.

In the depicted embodiment, the graphical flow view 402 may start execution via a trigger 404. More specifically, if a certain user record is updated, then the trigger 404 may "fire" and execute Action 406. The Action 406 may then retrieve a set of tasks assigned to the updated user that have an open state. The retrieved tasks may then be further process via a "Do . . . Until" control logic. More specifically, a Do logic 408 may execute one or more Actions, such as Action 410, until the "Until" control logic 410 has its conditions met. More sub-flows and/or Actions may be added, for example, via the "+" control 414. As shown, natural language and visual composition via the flow designer 302 may be used to enable the creation of executable flow objects 300. The flow objects 300 may then be reused by clients connected to the network 12.

Figure 6:
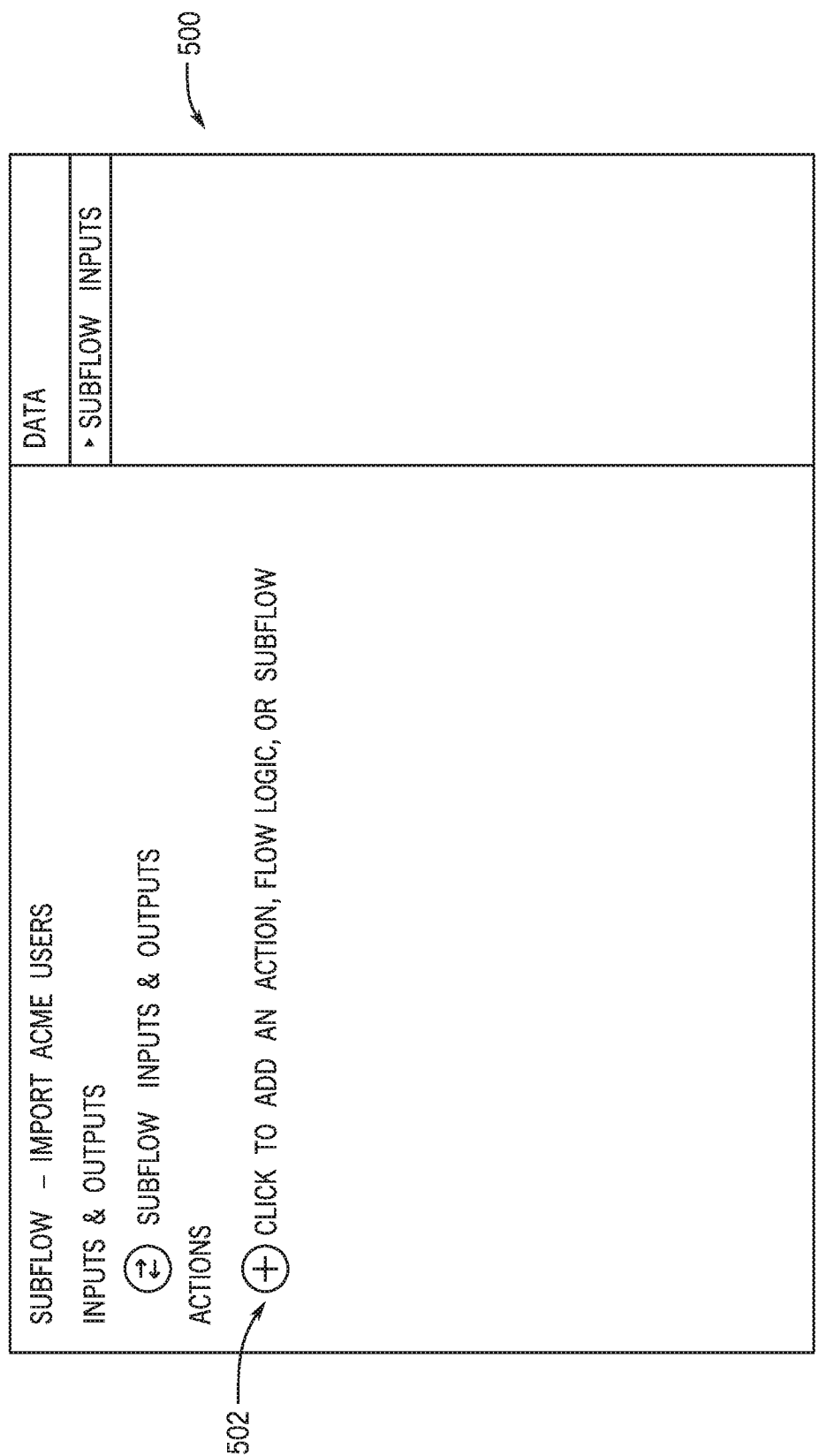
FIG. 6 is a screenshot of an embodiment of a graphical user interface (GUI) suitable for selecting certain Data Stream objects and using the objects as part of a Flow Designer system Flow or Subflow, in accordance with an embodiment.
Figure 7:
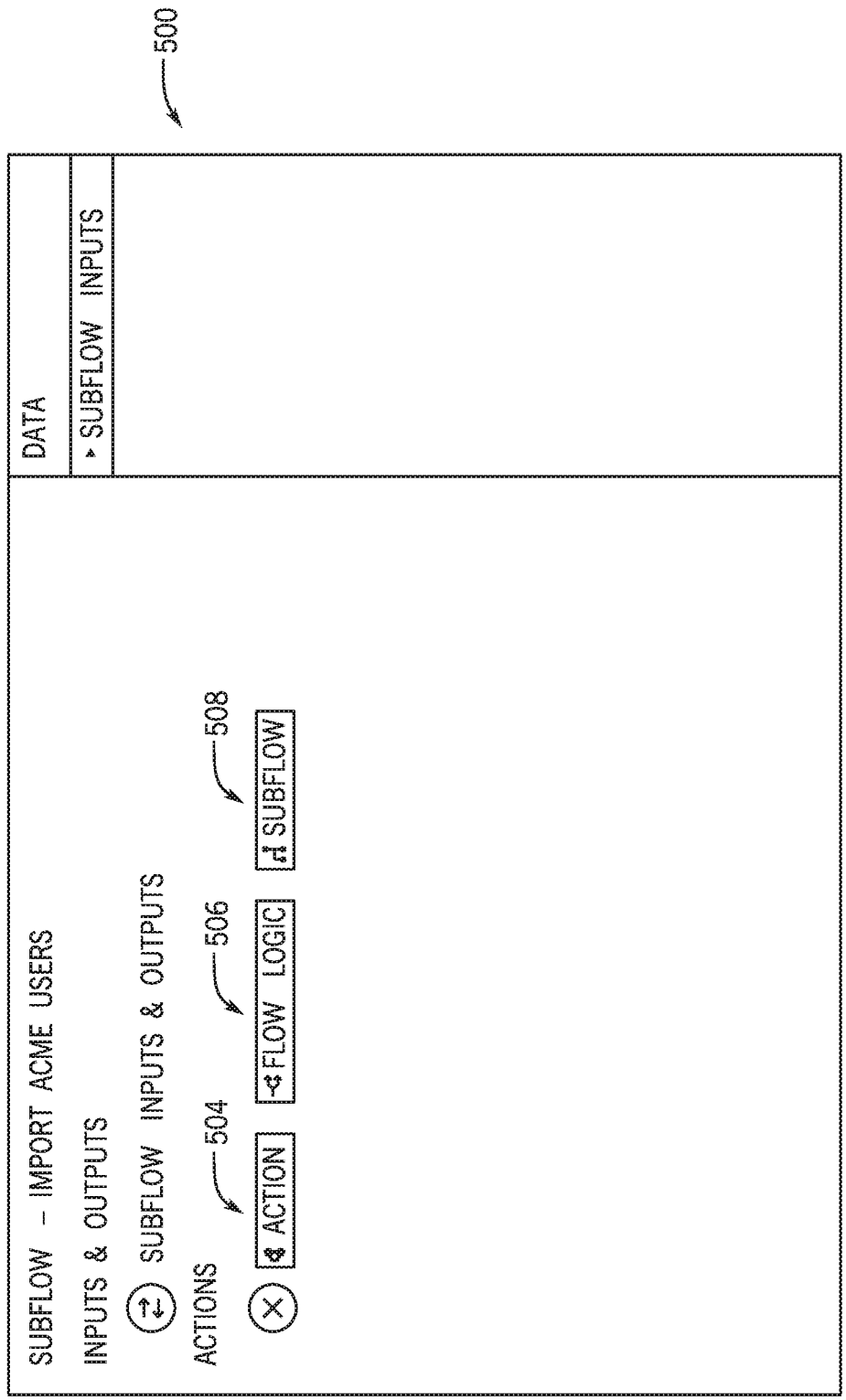
FIG. 7 is a screenshot of an embodiment of GUI illustrating visual controls that may be used to select new Actions, Flows, and Subflows, in accordance with an embodiment.

Turning now to FIG. 6, the figure is a screenshot of an embodiment of a GUI 500 suitable for selecting certain Data Stream objects and using the objects as part of a Flow, such as the Flow 301. The GUI 500 may be included in the Data Stream Handler system 28 and/or the Flow Designer system 112. The GUI 500 may be part of a template-based approach to selecting certain Data Stream objects, such as Data Stream Action objects. In the depicted embodiment, the user may activate a control 502 to add an Action, Flow, or Subflow. Activating the control 502 may then result in the GUI 500 showing various objects that may be selected, as shown in FIG. 7. More specifically, the FIG. 7 is a screenshot of an embodiment of the GUI 500 illustrating controls 504, 506, and 508 that may be used to select new Actions, Flows, and Subflows, respectively. Activating the control 504 may then result in a dialog box 510, as shown in FIG. 8.

Figure 8:
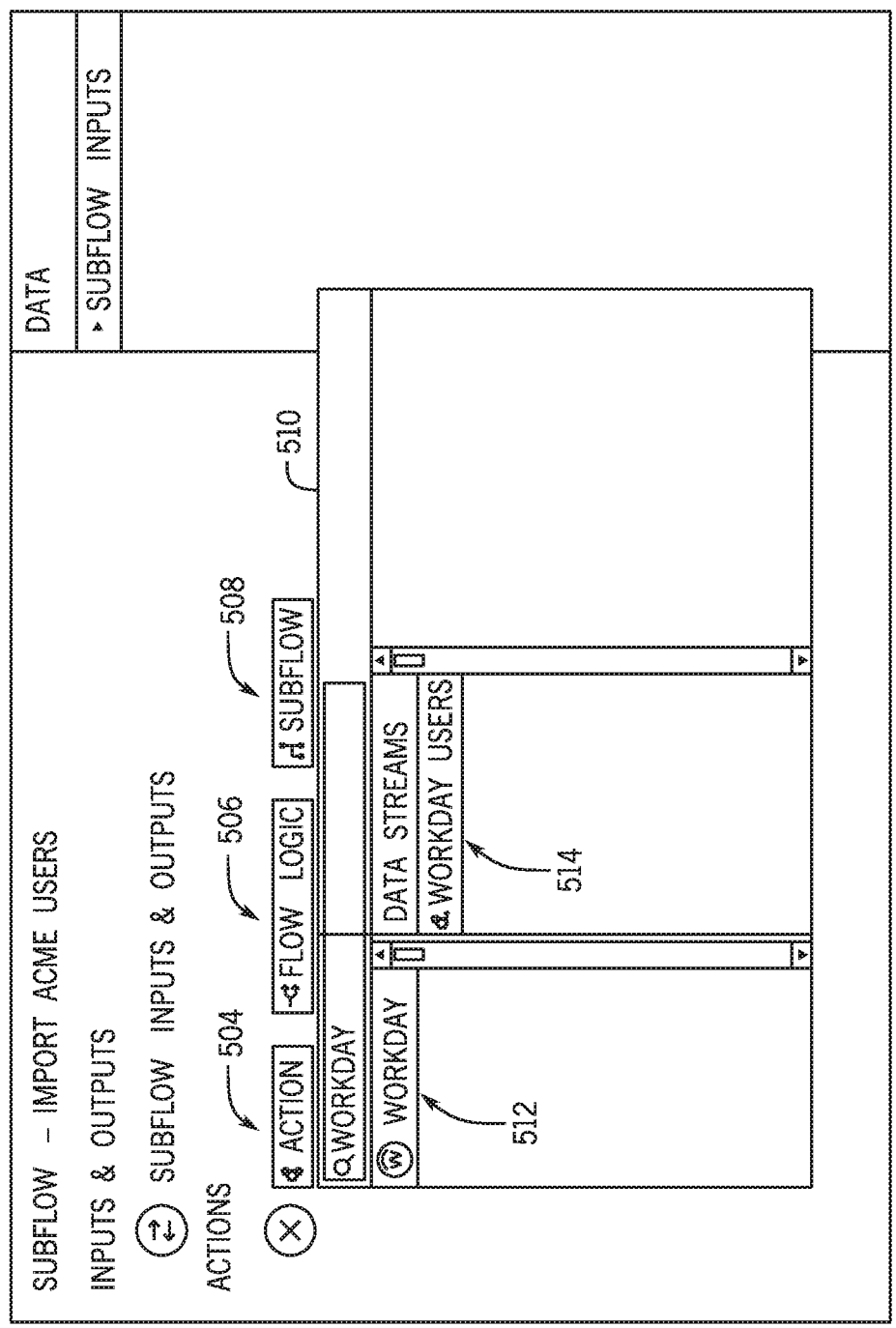
FIG. 8 is a screenshot of an embodiment of a GUI illustrating a dialog box 510 that may include listbox controls to select certain configuration data, in accordance with an embodiment.

More specifically, FIG. 8 is a is a screenshot of an embodiment of the GUI 500 illustrating the dialog box 510 that may include listbox controls 512 and 514. The listbox 512 is depicted as listing a single external system 30, e.g., but other external systems 30 may be included. Selecting an external system 30 via the control 512 may then result in the control 514 displaying Data Stream objects that may be created and configured to interact with the selected external system 30. Selecting a Data Stream object via the control 514 may then result in the GUI 500 displaying a graphical representation of a logic, e.g., "For Each" logic, that may be used to process the data incoming via the selected object, e.g., Data Stream Action, as shown in FIG. 9.

Figure 9:
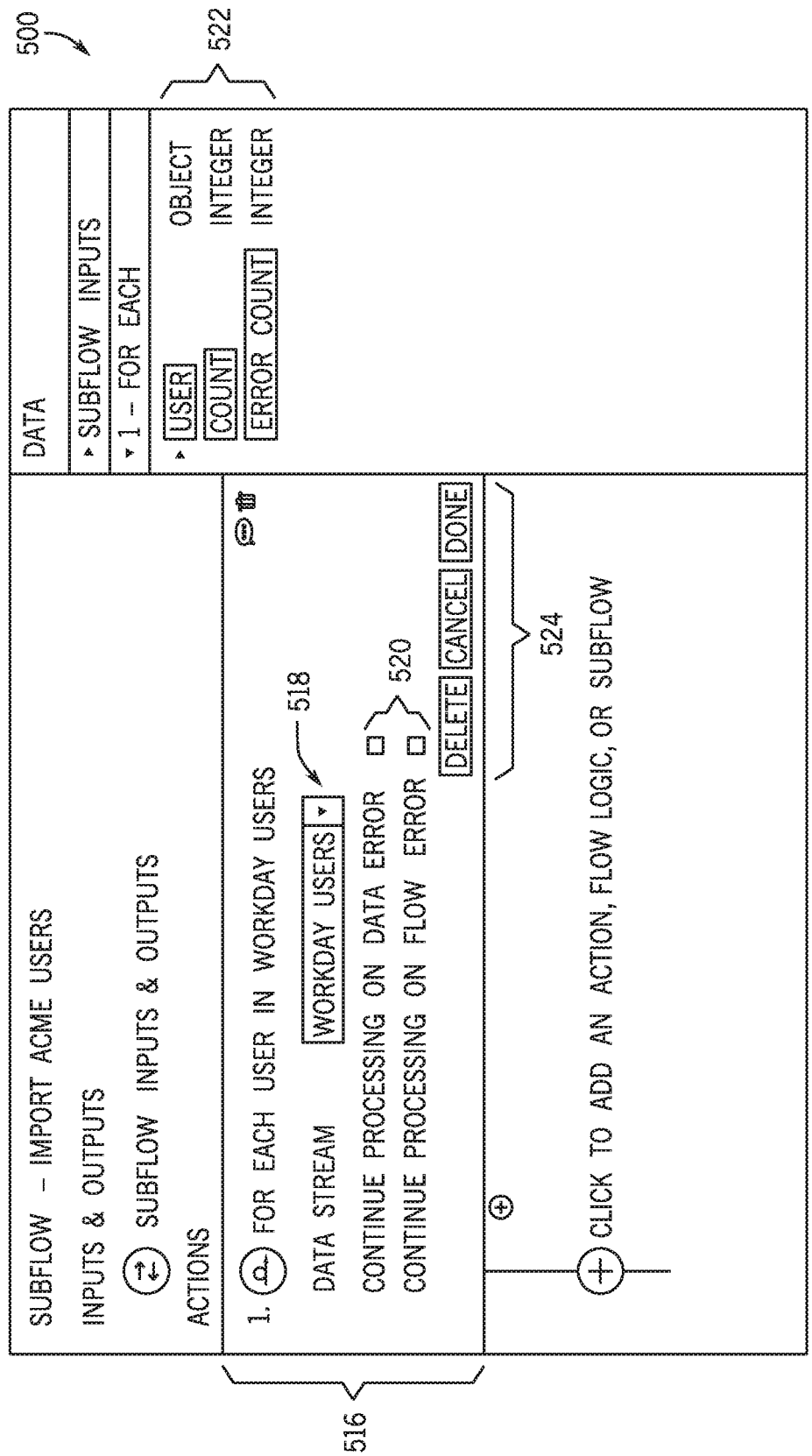
FIG. 9 is a screenshot of an embodiment of a GUI shown as displaying a "For Each" logic section that may enable a user to select a Data Stream object, in accordance with an embodiment.

FIG. 9 is a screenshot of an embodiment of the GUI 500 shown as displaying a "For Each" logic section 516 that may enable the user to select a Data Stream object, e.g., Data Stream Action object shown, and then use the Data Stream object to interact with the external system 30. For example, a control 518 may be used to select a Data Stream object, and based on the selection, a section 522 of the GUI 500 may then list one or more associated "data pills." A "data pill: may be referred to as a data object that may include one or more slots storing certain information. For example, a User data pill may store user first name, user last name, user address, user ID, and so on. The data pill may then be used, for example by dragging and dropping the data pill into another object (e.g., Step), a pre-written script, and so on, in lieu of typing a variable. By providing for visual controls suitable for selecting certain Data Stream objects and associated data pills, the techniques described herein may enable non-developer personnel to create automated processes.

Figure 10:
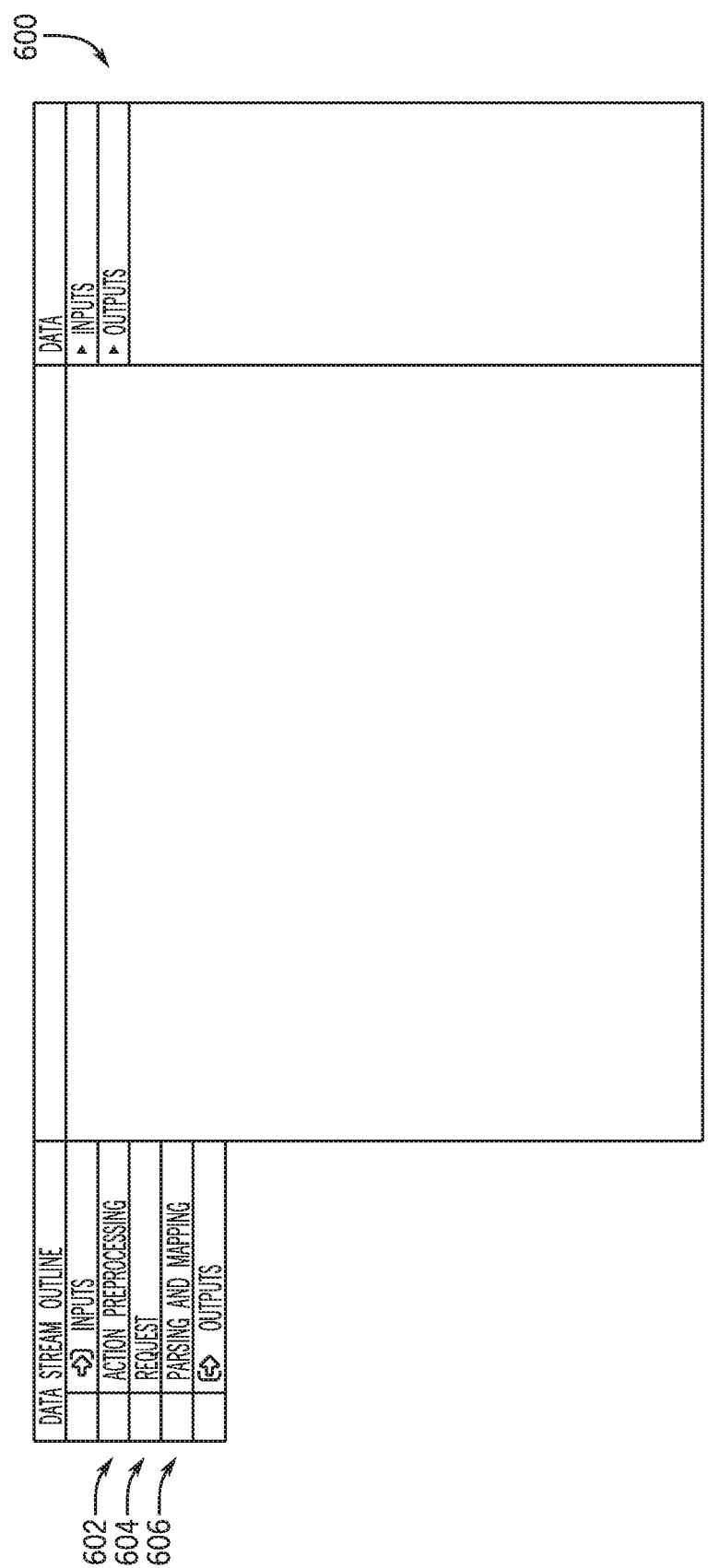
FIG. 10 is a screenshot of an embodiment of a GUI that may be used to create and configure certain of the Data Stream objects, in accordance with an embodiment.

Turning now to FIG. 10, the figure is a screenshot of an embodiment of a GUI 600 that may be used to create and configure certain of the Data Stream objects, such as the Data Stream Action shown being used by GUI 500. The GUI 600 may be included in the Data Stream Handler system 28 and/or the Flow Designer system 112. In the depicted embodiment, a Data Stream Outline section includes an Action Preprocessing control 602, a Request control 604, and a Parsing and Mapping control 606. The Action Preprocessing control may be used define objects and/or scripts to be executed before an API request is called. The Request control 604 may be used to configure an API request, as shown in FIG. 11.

Figure 11:
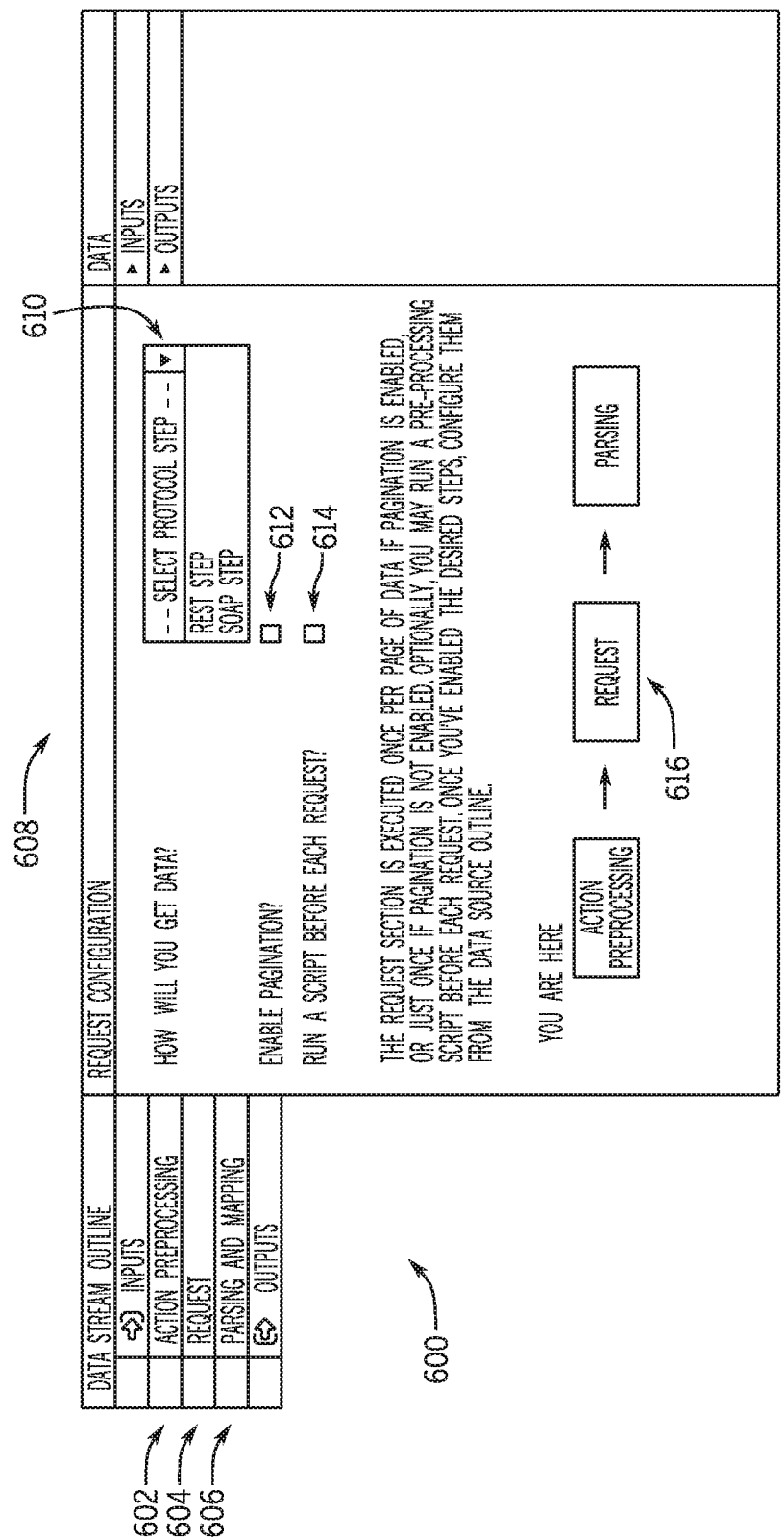
FIG. 11 is a screenshot of an embodiment of a GUI displaying a request configuration section, in accordance with an embodiment.

FIG. 11 is a screenshot of an embodiment of the GUI 600 now displaying a request configuration section 608. The request configuration section 608 may be displayed after the user activates the Request control 604. In the depicted embodiment, a control 610 may display a list of protocol Steps (e.g., REST steps, SOAP steps) that may be used to retrieve data from the external systems 30. As mentioned earlier, pagination support is provided. Accordingly, a control 612 may be activated when pagination processing is desired. Control 614 may be activated if a script is to be run before each request. A flowchart block 616 is also shown, useful in visually displaying where in the process of configuring the Data Stream object the user is currently at.

Figure 12:
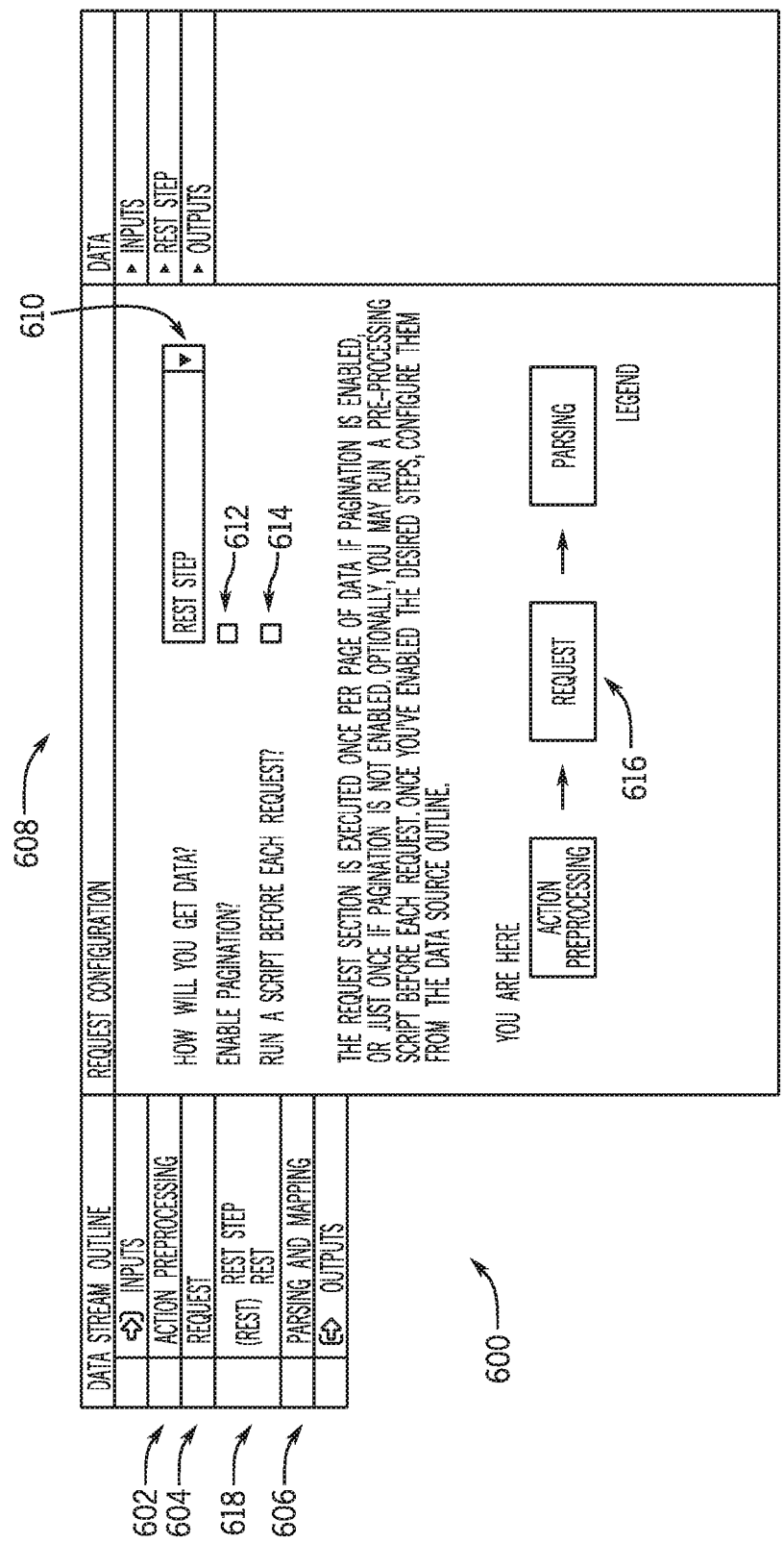
FIG. 12 is a screenshot of an embodiment of a GUI displaying a REST step control in a Data Stream outline section, in accordance with an embodiment.

After selecting a protocol Step via the control 610, the GUI 600 may now display the new protocol Step as shown in FIG. 12. More specifically, FIG. 12 is a screenshot of an embodiment of the GUI 600 now displaying a REST step control 618 in the Data Stream outline section. By dynamically expanding the Data Stream outline section, the techniques describe herein provide positive visual feedback on changes as the template Data Stream object configuration process guides the user through various options. If pagination is desired, the user may then activate the control 612, and a pagination configuration may then be displayed, as shown in FIG. 13.

Figure 13:
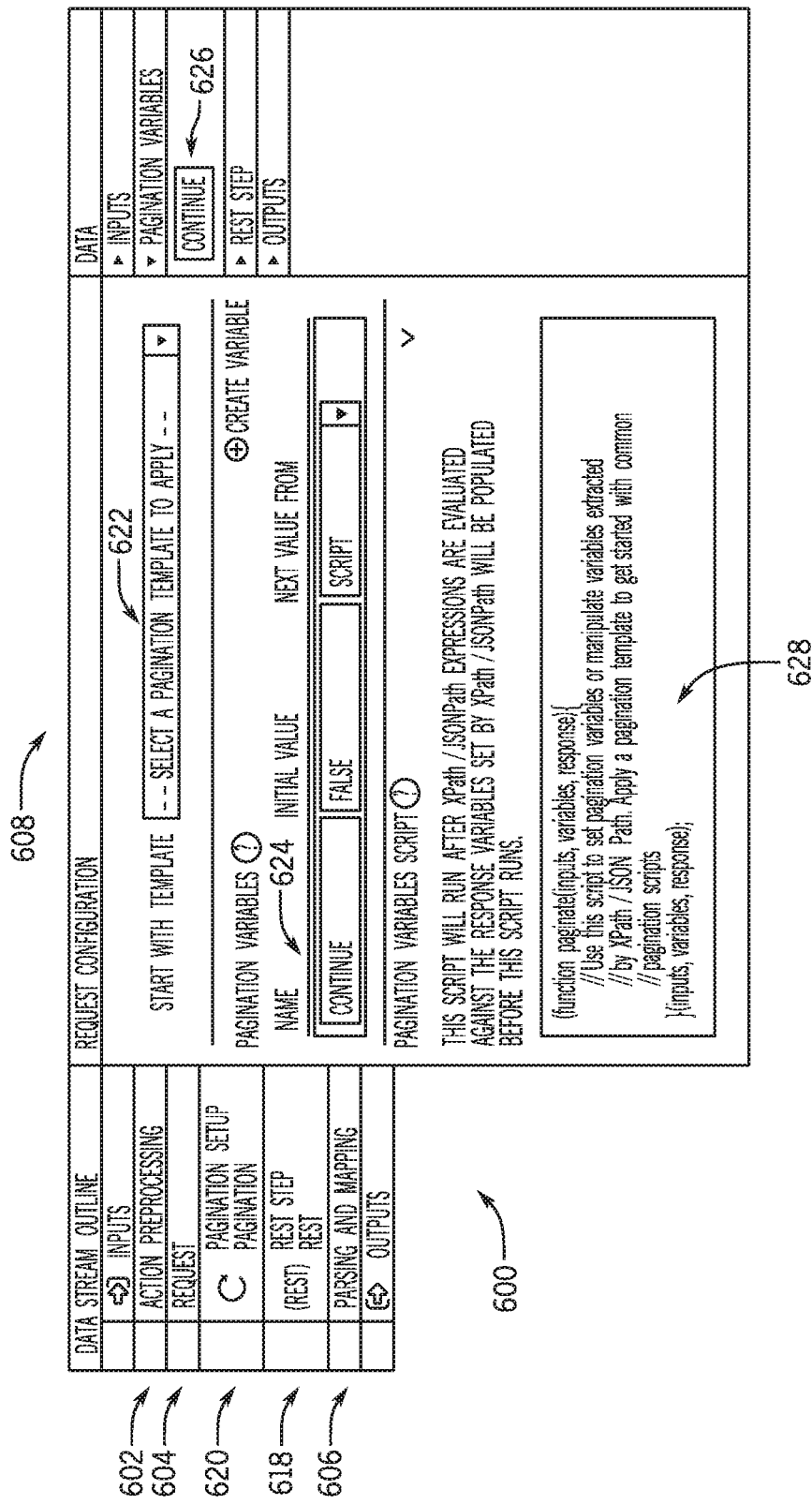
FIG. 13 is a screenshot of an embodiment of a GUI displaying a pagination configuration as part of the request configuration section, in accordance with an embodiment.

FIG. 13 is a screenshot of an embodiment of the GUI 600 now displaying a pagination configuration as part of the request configuration section 608. In the depicted embodiment, the data stream outline may now include a pagination setup control 620. Further, the request configuration section 608 may now include a control 622 suitable for selecting various pagination templates to use, e.g., Next Page token pagination, Next link pagination, Offset pagination, and/or Custom pagination.

A pagination variable section 624 may include a "continue" variable. The continue variable may be set to a default value, e.g., false, and may be used to stop/restart pagination via certain custom logic. The continue variable is provided as a data pill 626 for ease of use (e.g., to be drag-and-dropped into other controls as desired). Also displayed by the GUI 600 is control (e.g., editor control) 628 having a default script to be used to manipulate pagination variables and/or logic for further customization of the pagination process selected via the control 622.

Figure 14:
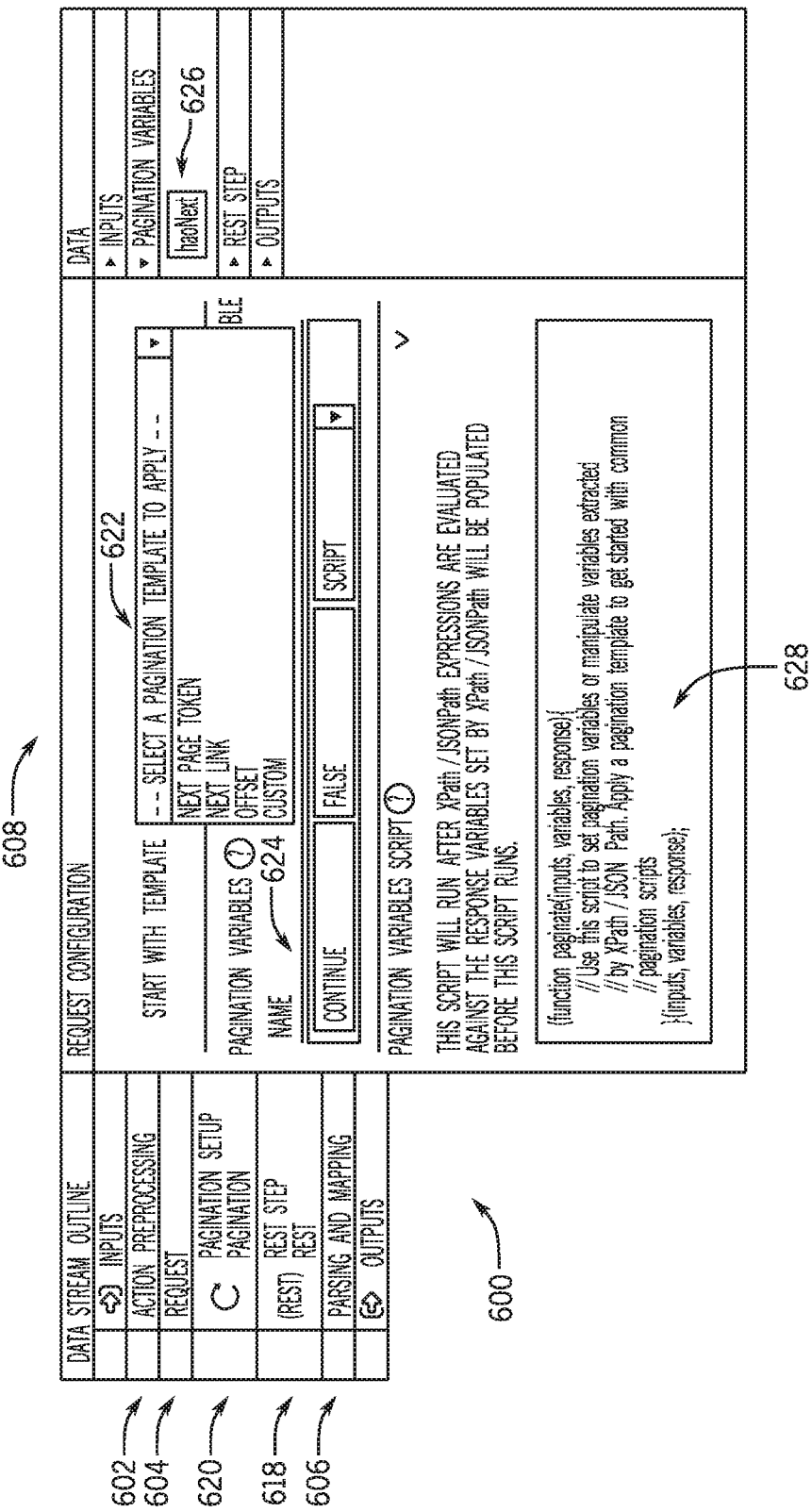
FIG. 14 a screenshot of an embodiment of a GUI displaying various pagination selections, in accordance with an embodiment.
Figure 15:
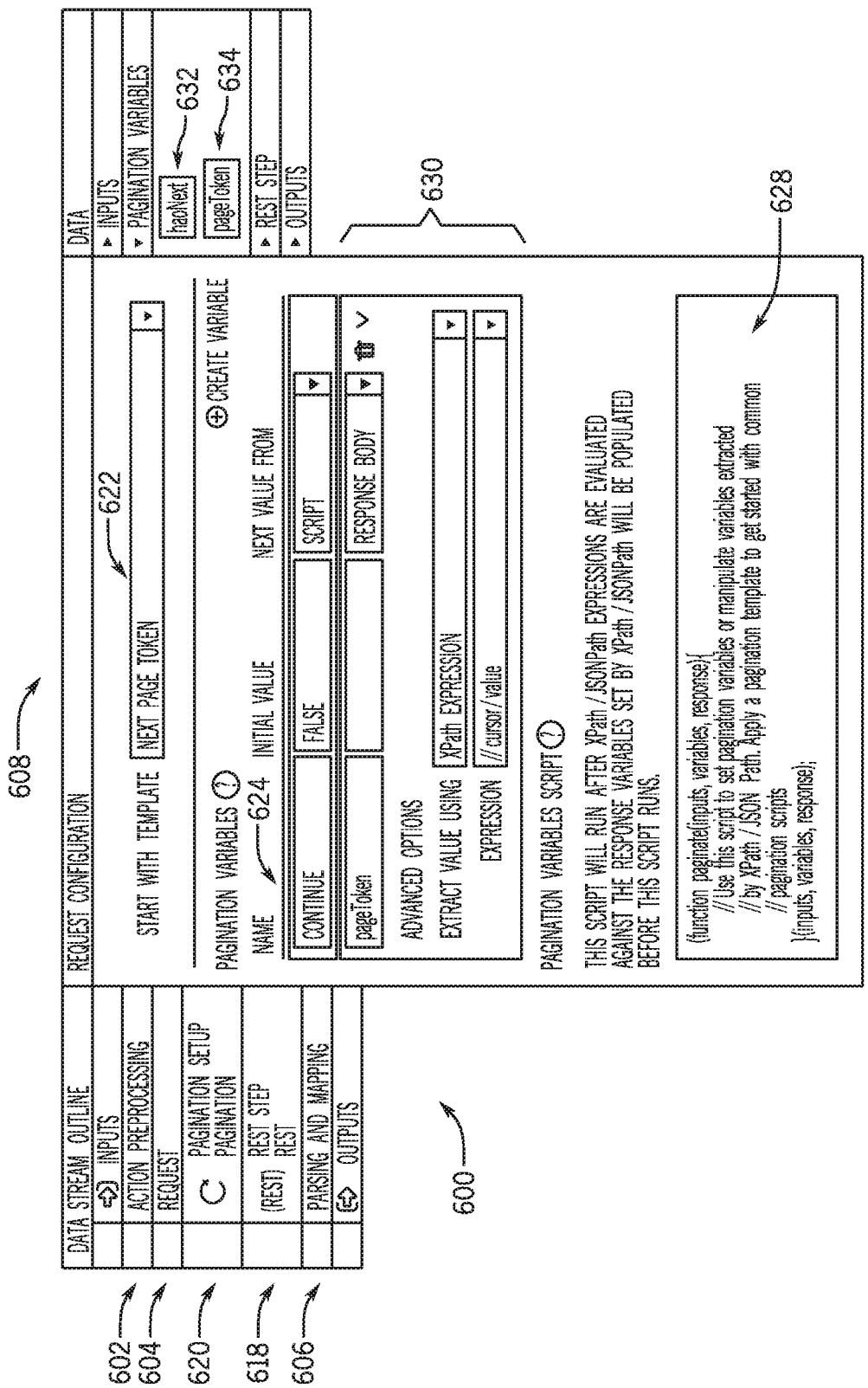
FIG. 15 is a screenshot of an embodiment of a GUI illustrating a section that may include controls specific to Next Page token pagination, in accordance with an embodiment.

Turning now to FIG. 14, the figure is a screenshot of an embodiment of the GUI 600 now displaying various pagination selections in the control 622 as the user activates the control 622. The user may then select any of the options displayed in the control 622. Each option selected may then result in a display of further configuration controls specific to the selected option. For example, FIG. 15 is a screenshot of an embodiment of the GUI 600 illustrating a section 630 that may include controls specific to Next Page token pagination. For example, a page token value may be retrieved from a response body of the response (e.g., as opposed to header), and the page token value may be extracted using XPath expressions. It is to be noted that other extraction of values may include using JavaScript Object Notation (JSON) expressions. Also shown are a "hasNext" data pill 632 and a page token data pill 634, which are automatically placed by the GUI 600 when the template is a next page token template. By providing for default settings for various pagination options (e.g., Next Page token pagination, Next link pagination, Offset pagination, and/or Custom pagination), the techniques described herein may provide for more efficient request configuration and for more flexible customization of pagination options.

Figure 16:
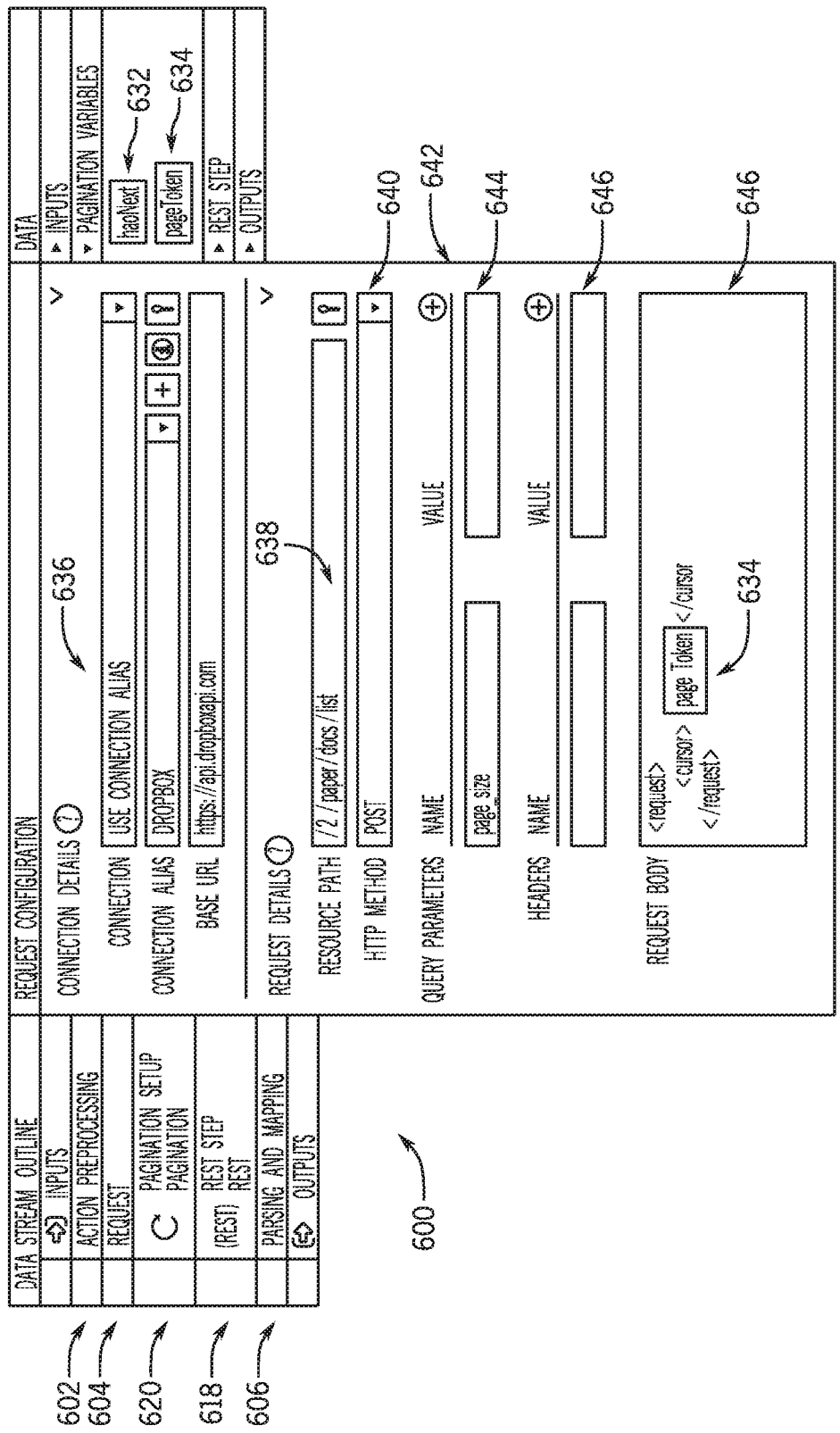
FIG. 16 is a screenshot of an embodiment of a GUI displaying a connections detail section that may be used to enter connection information, in accordance with an embodiment.

Once the pagination configuration is as desired, the user may then activate the REST Step control 618 to continue the request configuration, e.g., REST request configuration, as shown in further detail with respect to FIG. 16. More specifically, FIG. 16 is a screenshot of an embodiment of the GUI 600 now displaying a connections detail section 636 that may be used to enter connection information. For example, a connection alias may be used, which encapsulates URL's, URI's, login names, identification information, and so on, suitable for connecting to the external systems 30.

The GUI 600 may now also provide for further request details. For example, a control 638 may be used to select a resource pat, while a control 640 may be used to select an HTTP method (e.g., GET, POST, PUT). Query parameters for the request may be entered in control 6442, while Header values may be captured via control 644. Likewise a control 646 may be used to enter Request Body information. As mentioned earlier, data pills may be used via drag-and-drop to enter data into certain controls. For example, the page token data pill 634 is shown as "dropped" into the control 646. When the request is built, the page token data pill 634 may then be used to provide certain values for the Request Body.

Figure 17:
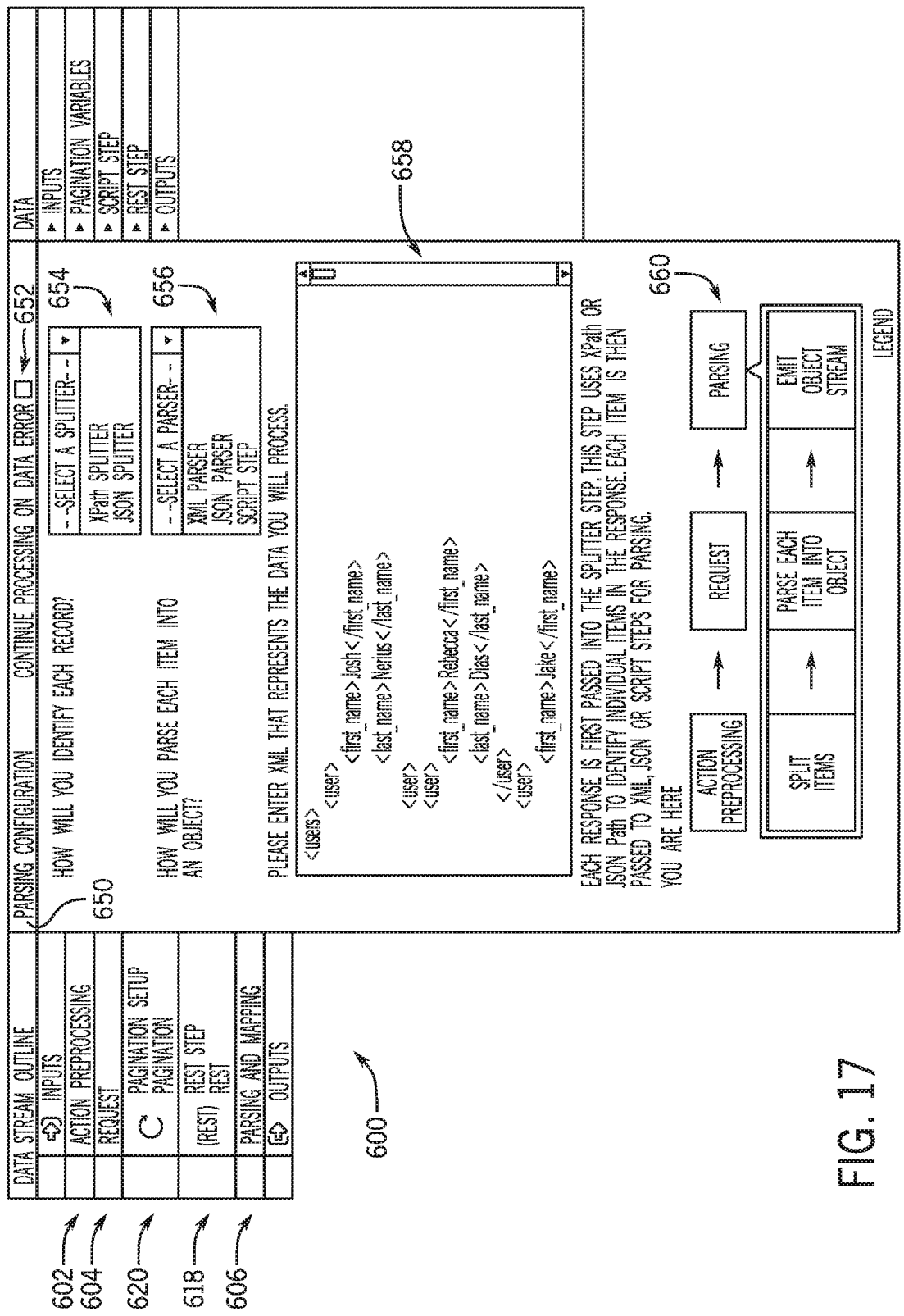
FIG. 17 is a screenshot of an embodiment of a GUI displaying both item splitting configuration and item parsing configuration for data incoming from external systems, in accordance with an embodiment.

Activating the parsing and mapping control 606 may then bring up a parsing configuration section 650, as shown in FIG. 17. More specifically, FIG. 17 is a screenshot of an embodiment of the GUI 600 displaying both item splitting configuration and item parsing configuration for data incoming from the external systems 30. In the depicted example, a control 654 may be activated to select a "splitter" that may be used to identify individual records in a response to the transmitted request.

For example, a request may ask for a listing of current users and a response from the external system 30 may include XML having multiple user records, each record having information for a given user. The splitter may first process the XML response to split out individual items (e.g., records) from the response, and each item may then be sent to a parser for further processing. Accordingly, a control 656 may be used to select a desired parser. A control 658 may be used to enter some sample XML. That is, sample XML may be entered to test the splitter and/or parser. Also shown in a "Parsing" block 660, used by the GUI 600 to illustrate where in the Data Stream outline the user is currently at.

Figure 18:
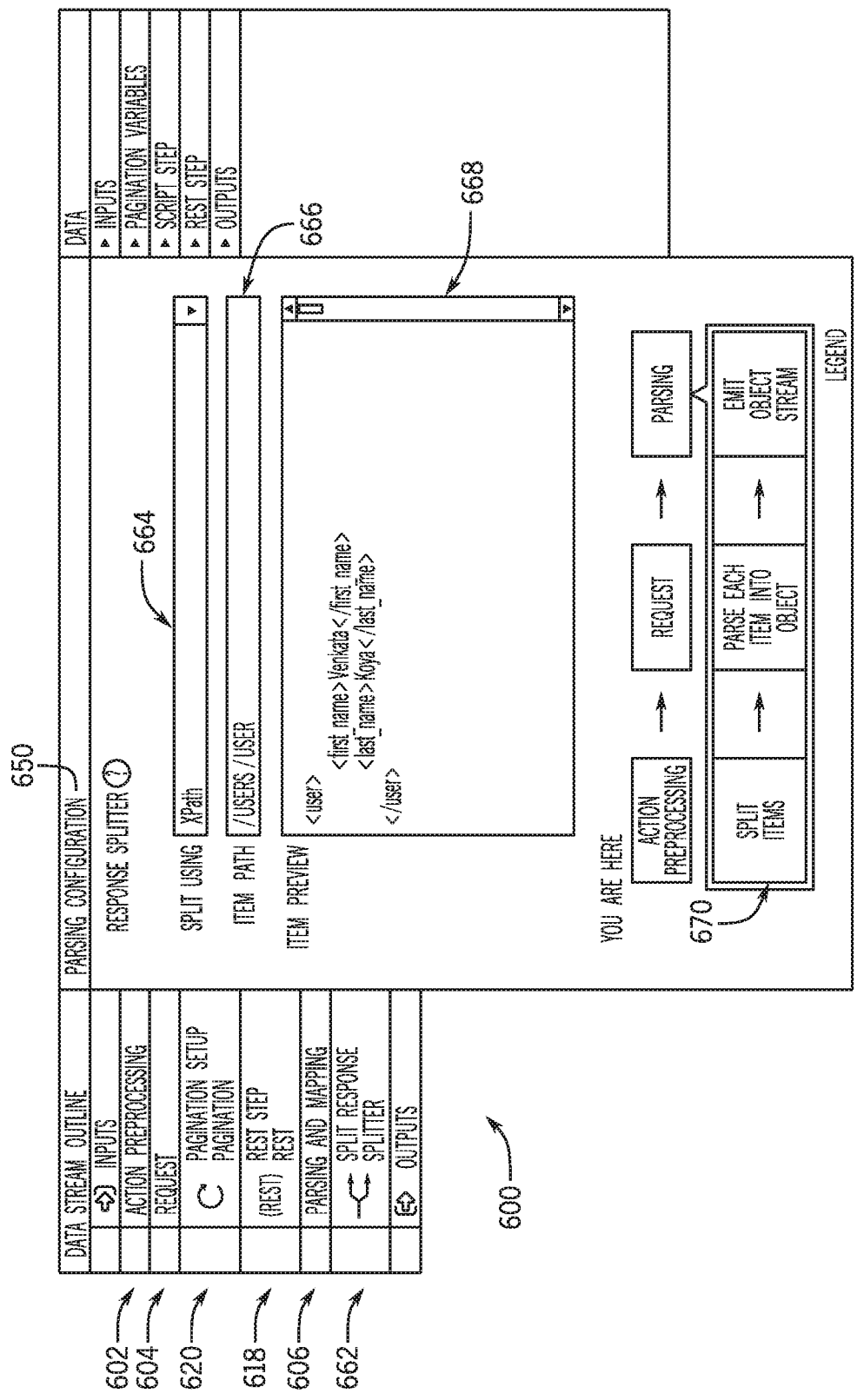
FIG. 18 is a screenshot of an embodiment of a GUI after the user has selected XPath as a splitter, in accordance with an embodiment.

FIG. 18 is a screenshot of an embodiment of the GUI 600 after the user has selected XPath as a splitter. That is, once the user selects a splitter via the control 654 and a parser via the control 656, the GUI 600 may display a Split Response control 662 in the Data Stream outline, as shown in FIG. 18. Further, a control 664 may display the selected splitter, e.g., XPath, and a control 666 may display an item path for the selected splitter. Also shown is an item preview control 668, which may show the splitter processing the sample XML data in the control 658 to extract one item. Also shown is a "Split Items" block 670 to illustrate where in the Data Stream configuration process the user is currently at.

Figure 19:
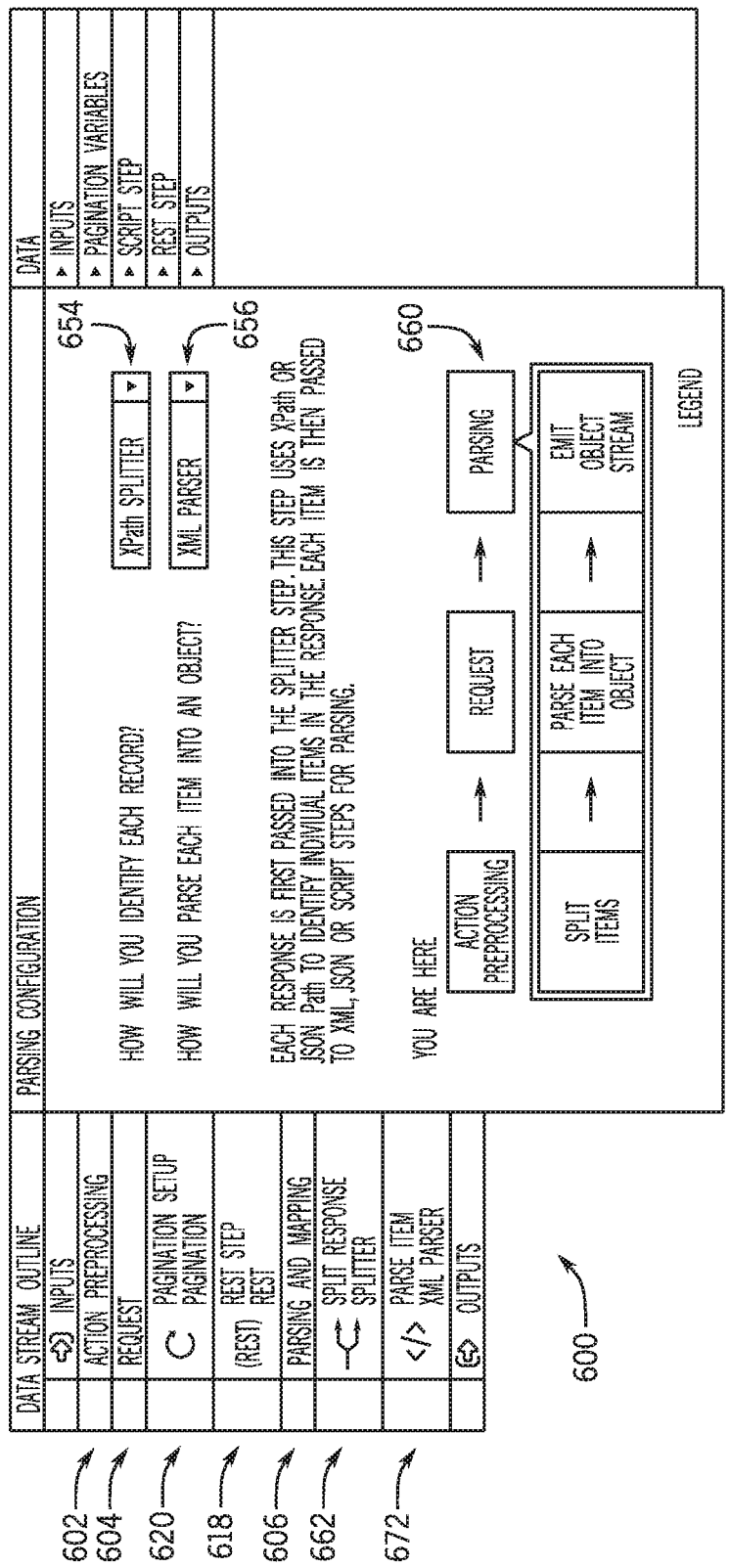
FIG. 19 is a screenshot of an embodiment of a GUI now displaying a Parse Item control after selection of an XML parser, in accordance with an embodiment.
Figure 20:
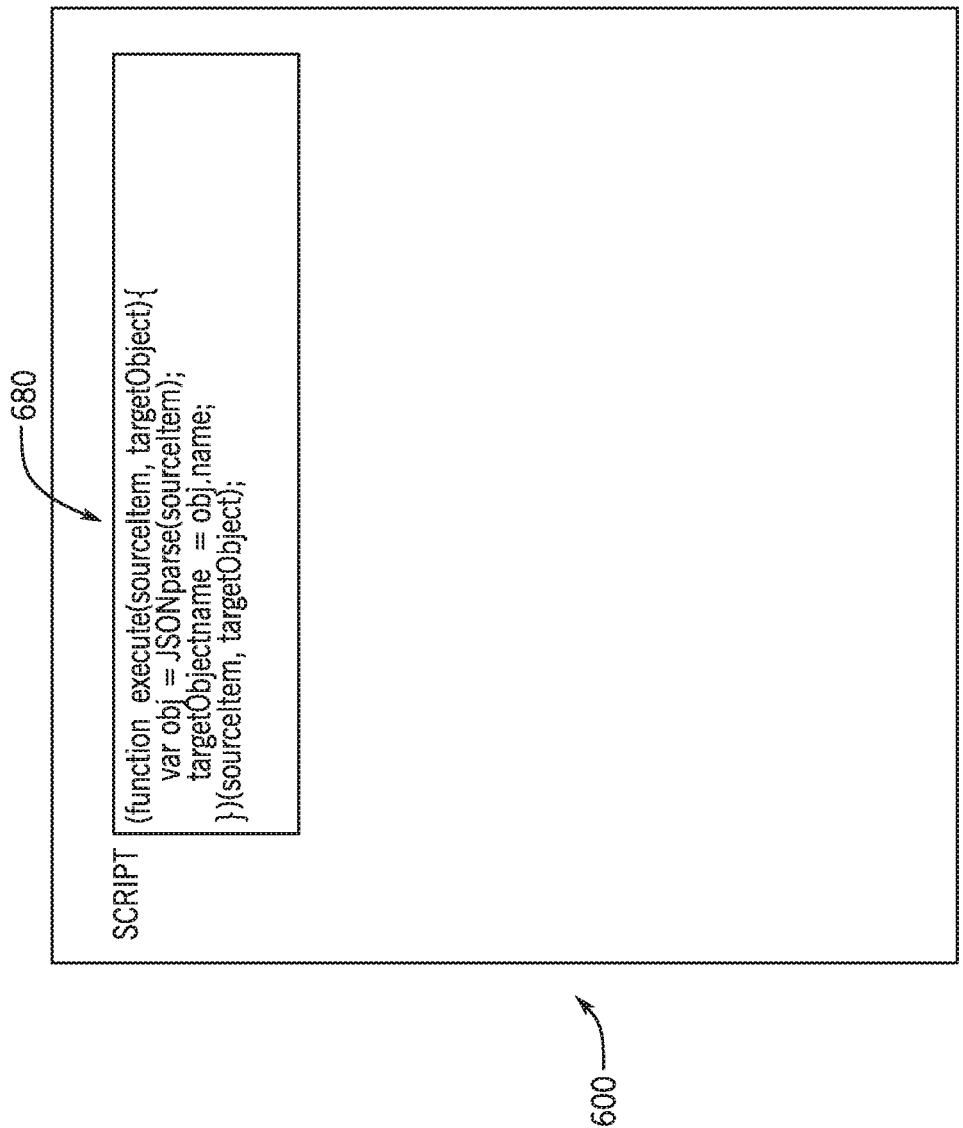
FIG. 20 is a screenshot of an embodiment of a GUI displaying a manual parser; in accordance with an embodiment.

FIG. 19 is a screenshot of an embodiment of the GUI 600 now displaying a Parse Item control 672 after selection of an XML parser via the control 656. During configuration of the parser (e.g., XML parser), the user may then select the Parse Item control 672 to enter XML parser configuration information. However, the user may also decide to user a manual parser, as shown in FIG. 20. More specifically, FIG. 20 is a screenshot of an embodiment of the GUI 600 displaying a manual parser 680. The manual parser 680 enables a more sophisticated user to manually enter computer code, such as JavaScript code, that may then be executed when parsing items after the splitter has extracted them from a data stream incoming from the external systems 30. The manual parser may already include default parsing code that may then be modified (or completely rewritten) as desired.

Figure 21:
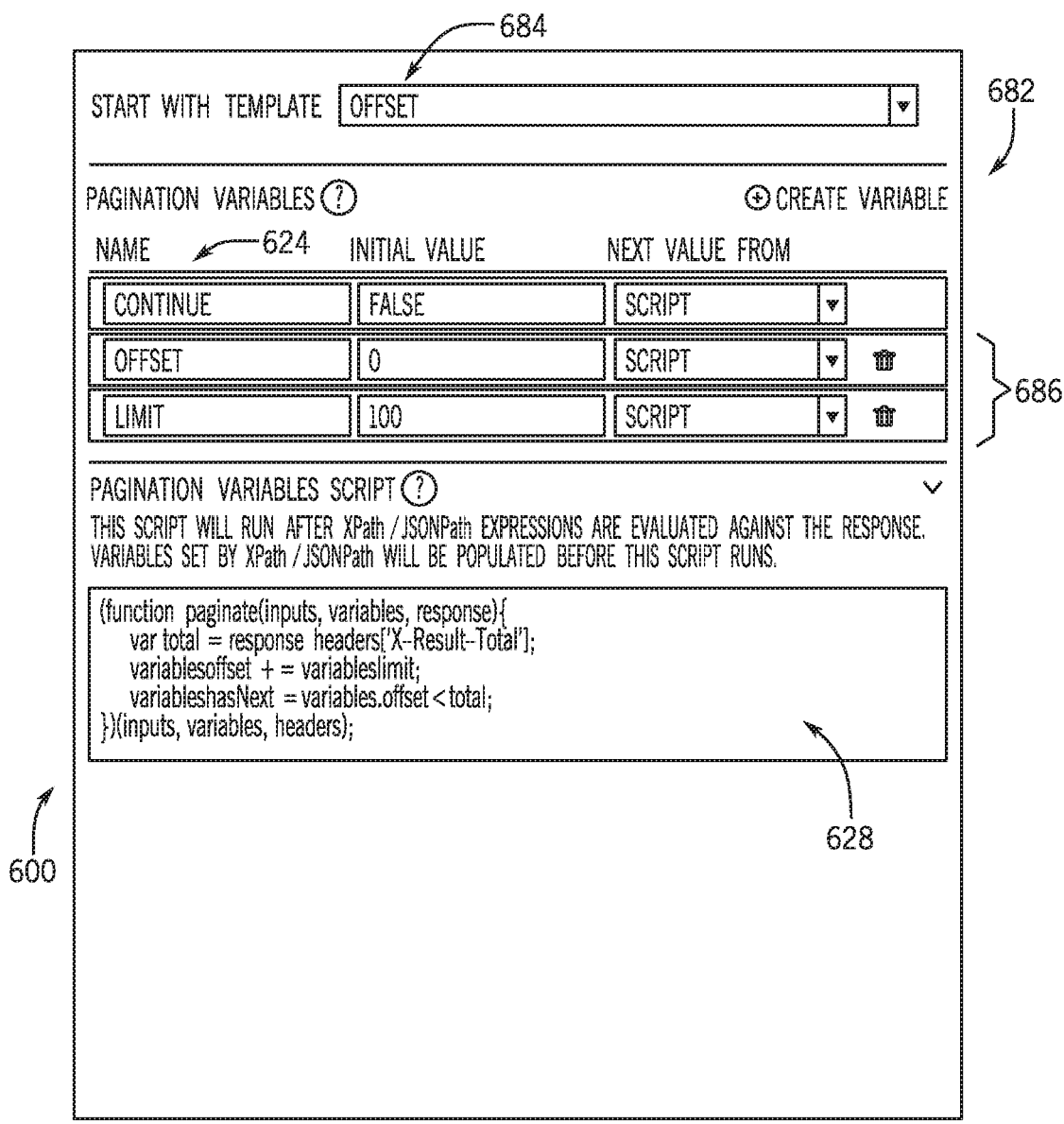
FIG. 21 is a screenshot of an embodiment of a GUI displaying an offset pagination configurator section, in accordance with an embodiment.

As mentioned earlier, pagination techniques provided by the GUI 600 may include next page token pagination, next link pagination, offset pagination, and/or custom pagination. FIG. 21 shows an example where the GUI 600 displays an offset pagination configurator 682. The user may have selected offset pagination via a control 684 and the GUI 600 may then present an offset configuration section 686. For example, an offset value is shown, having an initial value of 0, as well as an offset limit value, having an initial value of 100. Also shown is the control 628 that provide for offset pagination parsing configuration. As mentioned earlier, data pills may be dragged-and-dropped to customize certain behavior, including offset pagination logic shown in the control 628. The user may select a different set of offset pagination variables to use, as shown in FIG. 22.

Figure 22:
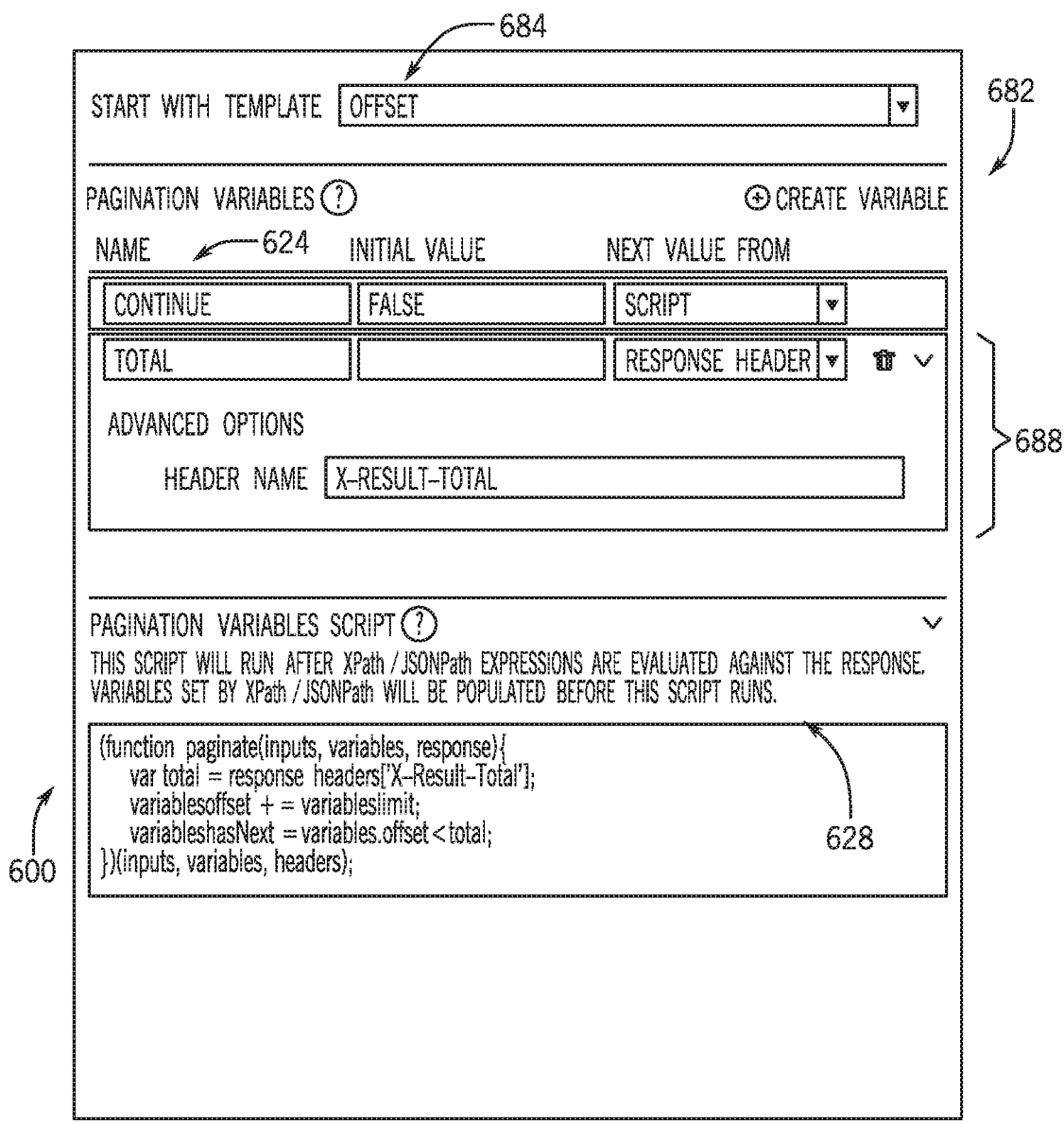
FIG. 22 is a screenshot illustrating an embodiment a GUI displaying an offset pagination configuration with a single total variable, in accordance with an embodiment.

FIG. 22. is a screenshot illustrating an embodiment of the GUI 600 displaying the offset pagination configuration 682 with a single total variable being used, as shown via the section 688. The total variable's value is retrieved from a response header, as opposed to from a script. Accordingly, a more flexible configuration for various pagination options, e.g., offset pagination, may be provided. By providing for visual tools that enable both use and creation of a variety of objects, such as Flow Designer objects, the techniques described herein may provide for a more efficient and flexible creation of automation processes by non-technical personnel.

Figure 23:
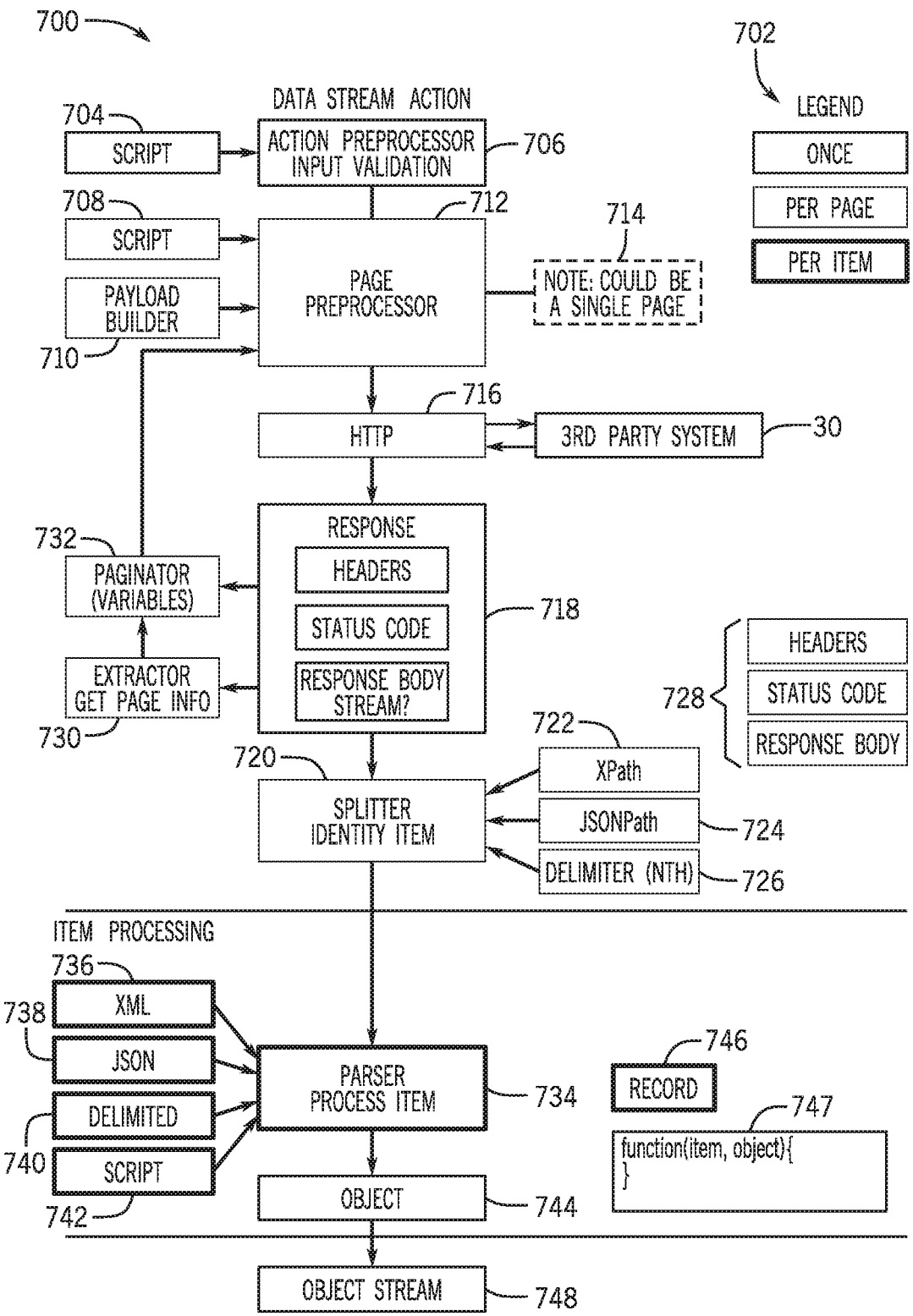
FIG. 23 is a flow chart of an embodiment of an information flow process suitable for implementing the techniques described herein, in accordance with an embodiment.

Turning now to FIG. 23, the figure depicts a flowchart of an embodiment of an information flow process 700 that may be used to implement some (or all) of the Stream Data Handler system 28. The process 700 may be implemented a computer code stored in the memory 206 and executable by processor(s) 202. A legend 702 for the diagram is also shown. In the depicted embodiment, a script 704 may be executed only once, e.g., during preprocessing of a Data Stream object, such as a Data Stream Action. The preprocessing script 704 may first undergo input validation via an action preprocessor input validation system so that preprocessing inputs are first validated, and may then be subsequently executed. A script 708 may be used as input, as well as inputs provided via a payload builder 710, to provide a page preprocessor 712 with inputs for preprocessing to provide a request as output. The script 708 and the inputs provided by the payload builder 710 may be provided once per page. It is to be noted that a single page 714 may be used, in addition to multiple page processing.

The payload builder 710 may build a request payload, e.g., payload used to generate a HTTP 716, e.g., GET, POST, and/or PUT 716. For example, data requests, such as user requests, database requests, and so on, may be included in the HTTP GET, POST, and/or PUT 716. The HTTP GET, POST, and/or PUT 716 may then be communicated, e.g., via REST, SOAP, and so on, to the external system 30. The external system 30 may then respond, for example, also via HTTP 716. That is, the HTTP 716 may include a response to a request, such as a response 718. The response 718 may in turn include response headers, response status code, and/or a response body, which in some cases may be a stream. In some cases, the response 718 stream may be paginated. That is, the response 718 may include multiple pages of data. Ins some cases, the response body is a stream without pagination. A splitter 720 may handle both non-paginated data streams as well as pagination. During non-paginated data streaming, the splitter 720 may continuously identify items incoming from the data stream and split them into individual items, for example, via XPath 722, JSON-Path 724, and/or delimiter 724 (e.g., Nth item delimiter).

In cases with pagination, an extractor system 730 may be used to extract certain pagination information based on the pagination type used, e.g., next page token pagination, next link pagination, offset pagination, and/or custom pagination. A paginator system 732 may then derive certain variables' values, e.g., offset, total, next token, and so on, and provide the values as another input to the page preprocessor 712. The page preprocessor 712 may then output HTTP 716 that incorporates the values, for example to get another page back from the external system 30.

Each item split by the splitter 720 is then provided to a parser 734. The parser 734 may apply XML 736, JSON 738, delimited logic 740, executable script logic 742, or a combination thereof, to each item, transforming the item into objects, such as data pills, to be used, for example, via the Flow Designer system 112 in Flows, Subflows, Actions, Steps, and so on. In some embodiments, a stream 748 of objects 744 may thus be provided, enabling automated process to handle very large datasets.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computing system, comprising:
a server communicatively coupled to a data repository and configured to store a data in the data repository, wherein the server is configured to perform operations comprising:
creating, via a data stream handler system, a data stream object configured to be implemented into a flow that is configured to process a dataset, a data stream, or a combination thereof;
presenting, via the data stream handler system, a selectable feature that, when selected, is configured to enable a selection to paginate the dataset or the data stream;
receiving, via the data stream handler system, the selection to paginate the dataset or the data stream;
in response to receiving the selection to paginate the dataset or the data stream, providing a menu to select a type of pagination, wherein the menu comprises a plurality of types of pagination, and wherein at least one type of the plurality of types of pagination is next page token pagination, next link pagination, or offset pagination;
receiving, via the data stream handler system, a selection of a type of pagination from the menu;
in response to receiving the selection of the type of pagination from the menu, providing a set of options detailing one or more variables for customization based on the type of pagination selected;
configuring, via the data stream handler system, the data stream object to transmit a request including one or more selected options from the set of options to an external system; and
configuring, via the data stream handler system, the data stream object to capture a response to the request from the external system, wherein the response to the request comprises the pagination of the dataset, the pagination of the data stream, or a combination thereof, wherein creating the data stream object, configuring the data stream object to transmit the request, configuring the data stream object to capture the response, or a combination thereof, comprises using visual controls in lieu of entering text for a computer program.

2. The computing system of claim 1, wherein configuring the data stream object to transmit the request comprises configuring the data stream object to call an application programming interface (API) included in the external system.

3. The computing system of claim 2, wherein the server is configured to perform operations comprising executing a script in a preprocessor system only once to configure the data stream object to transmit the request.

4. The computing system of claim 3, wherein at least one of the visual controls is configured to provide for a drag-and-drop operation of a data pill into the script, and wherein the data pill comprises a visual data object resolving to at least one value.

5. The computing system of claim 1, wherein configuring the data stream object to capture the response comprises configuring a splitter system to receive the response and to extract at least one item from the response.

6. The computing system of claim 5, wherein configuring the splitter system to receive the response and to extract at least one item from the response comprises applying an XPath, a JavaScript Object Notation JSON Path, or a delimiter system to the response.

7. The computing system of claim 5, wherein configuring the data stream object to capture the response comprises providing the at least one item to a parser for parsing the at least one item into an object.

8. The computing system of claim 7, wherein the item comprises an XML item and wherein the object comprises a Visual Designer Flow system object.

9. A method, comprising:
creating, via a data stream handler system, a data stream object configured to be implemented into a flow that is configured to process a dataset or a data stream;
presenting, via the data stream handler system, a selectable feature that, when selected, is configured to enable a selection to paginate the dataset or the data stream;
receiving, via the data stream handler system, the selection to paginate the dataset or the data stream;
in response to receiving the selection to paginate the dataset or the data stream, providing a menu to select a type of pagination, wherein the menu comprises a plurality of types of pagination, and wherein at least one type of the plurality of types of pagination is next page token pagination, next link pagination, or offset pagination;
receiving, via the data stream handler system, a selection of a type of pagination from the menu;
in response to receiving the selection of the type of pagination from the menu, providing a set of options detailing one or more variables for customization based on the type of pagination selected;

configuring, via the data stream handler system, the data stream object to transmit a request including one or more selected options from the set of options to an external system; and configuring, via the data stream handler system, the data stream object to capture a response to the request from the external system, wherein the response to the request comprises the pagination of the dataset, the pagination of the data stream, or a combination thereof, wherein creating the data stream object, configuring the data stream object to transmit the request, configuring the data stream object to capture the response, or a combination thereof, comprises using visual controls in lieu of entering text for a computer program.

10. The method of claim 9, wherein configuring the data stream object to capture the response comprises configuring a splitter system to receive the response and to extract at least one item from the response.

11. The method of claim 10, wherein configuring the data stream object to capture the response comprises providing the at least one item to a parser for parsing the at least one item into an object.

12. The method of claim 11, wherein the item comprises an XML item and wherein the object comprises a Visual Designer Flow system object.

13. A non-transitory, computer-readable medium storing instructions executable by a processor of a computing system, the instructions configured to:

create, via a data stream handler system, a data stream object configured to be implemented into a flow that is configured to process a dataset or a data stream;

present, via the data stream handler system, a selectable feature that, when selected, is configured to enable a selection to paginate the dataset or the data stream;

receive, via the data stream handler system, the selection to paginate the dataset or the data stream;

in response to receiving the selection to paginate the dataset or the data stream, provide a menu to select a type of pagination, wherein the menu comprises a plurality of types of pagination, and wherein at least one type of the plurality of types of pagination is next page token pagination, next link pagination, or offset pagination;

receiving, via the data stream handler system, a selection of a type of pagination from the menu;

in response to receiving the selection of the type of pagination from the menu, provide a set of options detailing one or more variables for customization based on the type of pagination selected;

configure, via the data stream handler system, the data stream object to transmit a request including one or more selected options from the set of options to an external system; and configure, via the data stream handler system, the data stream object to capture a response to the request from the external system, wherein the response to the request comprises the pagination of the dataset, the pagination of the data stream, or a combination thereof, wherein creating the data stream object, configuring the data stream object to transmit the request, configuring the data stream object to capture the response, or a combination thereof, comprises using visual controls in lieu of entering text for a computer program.

14. The computer-readable medium of claim 13, wherein the instructions to configure the data stream object to capture the response comprises instructions to configure a splitter system to receive the response and to extract at least one item from the response.

15. The computer-readable medium of claim 14, wherein the instructions to configure the data stream object to capture the response comprises the instructions to provide the at least one item to a parser for parsing the at least one item into an object.

16. The computer-readable medium of claim 15, wherein the item comprises an XML item and wherein the object comprises a Visual Designer Flow system object.

17. The computing system of claim 1, wherein the server is configured to perform operations comprising:

providing a data stream outline section configured to display one or more control steps of a data stream object configuration process to be completed during configuration of the data stream object, wherein each control step has one or more configurable options;

expanding the data stream outline section to display one or more additional control steps based on at least one of the one or more configurable options selected; and providing a flow chart block configured to display a location in the data stream object configuration process corresponding to a step currently being performed.

18. The method of claim 9, wherein configuring the data stream object to transmit the request comprises configuring the data stream object to call an application programming interface (API) included in the external system.

19. The computer-readable medium of claim 13, wherein the instructions to configure the data stream object to transmit the request comprises instructions to configure the data stream object to call an application programming interface (API) included in the external system.

* * * * *